(12) United States Patent
Macken et al.

(10) Patent No.: US 10,803,886 B1
(45) Date of Patent: Oct. 13, 2020

(54) BOND-PAD SHARING FOR HEAD-LEVEL THERMOCOUPLE

(71) Applicant: Seagate Technology LLC, Cupertino, CA (US)

(72) Inventors: Declan Macken, Eden Prairie, MN (US); Michael Thomas Johnson, Minneapolis, MN (US); Todd Michael Lammers, Lafayette, CO (US); Kent Edward Bodurtha, Richfield, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/234,831

(22) Filed: Dec. 28, 2018

Related U.S. Application Data

(60) Provisional application No. 62/611,714, filed on Dec. 29, 2017.

(51) Int. Cl.
*G11B 5/48* (2006.01)
*G11B 5/012* (2006.01)
*G11B 5/31* (2006.01)
*G11B 5/00* (2006.01)
*G11B 5/60* (2006.01)

(52) U.S. Cl.
CPC ............. *G11B 5/012* (2013.01); *G11B 5/314* (2013.01); *G11B 5/3133* (2013.01); *G11B 5/4846* (2013.01); *G11B 5/4853* (2013.01); *G11B 5/4866* (2013.01); *G11B 5/6005* (2013.01); *G11B 2005/0021* (2013.01)

(58) Field of Classification Search
CPC ..... G11B 5/3133; G11B 5/314; G11B 5/4853; G11B 5/6005
USPC .................. 360/234.3, 234.5, 125.3, 125.31
See application file for complete search history.

(56) References Cited

U.S. PATENT DOCUMENTS

| | | | |
|---|---|---|---|
| 6,347,983 B1 | 2/2002 | Hao et al. | |
| 6,907,322 B2 | 6/2005 | Ghoshal | |
| 7,014,530 B2 | 3/2006 | Kasiraj et al. | |
| 7,426,089 B2 | 9/2008 | Wada et al. | |
| 7,463,994 B2 | 12/2008 | Ohashi et al. | |
| 7,589,928 B2 | 9/2009 | Roy et al. | |
| 8,077,559 B1 | 12/2011 | Miyauchi et al. | |
| 8,441,896 B2 * | 5/2013 | Wang | G11B 5/105 369/13.13 |

(Continued)

FOREIGN PATENT DOCUMENTS

| | | | |
|---|---|---|---|
| CN | 102947683 B | 4/2016 | |
| JP | 4888491 B2 | 2/2012 | |

*Primary Examiner* — Jefferson A Evans
(74) *Attorney, Agent, or Firm* — Kagan Binder, PLLC

(57) ABSTRACT

An apparatus includes a slider configured for heat-assisted magnetic recording, the slider comprising an air bearing surface (ABS), a writer, a reader, and a plurality of electrical bond-pads. The apparatus also includes a first component situated at the ABS of the slider proximate the reader and operatively coupled to a first pair of the plurality of electrical bond-pads, the first component being a thermocouple configured to sense for a thermal aspect of a magnetic recording medium surface. According to aspects of the invention, the slider is configured to share at least one bond-pad by operatively coupling a second pair of the plurality of electrical bond-pads to a second component, and the slider is configured to selectively utilize the thermocouple and the second component.

20 Claims, 15 Drawing Sheets

(56) References Cited

U.S. PATENT DOCUMENTS

| | | | |
|---|---|---|---|
| 8,804,272 B1* | 8/2014 | Dakroub | G11B 5/6005 360/46 |
| 8,879,189 B2 | 11/2014 | Miyamoto et al. | |
| 8,895,832 B2 | 11/2014 | Fukada | |
| 9,095,951 B2 | 8/2015 | Gee et al. | |
| 9,595,288 B1 | 3/2017 | Chu et al. | |
| 9,607,641 B1* | 3/2017 | Ramakrishnan | G11B 5/607 |
| 9,759,613 B2 | 9/2017 | Kimura et al. | |
| 9,812,158 B1* | 11/2017 | Ramakrishnan | G11B 5/4853 |
| 9,824,705 B1* | 11/2017 | Macken | G11B 7/1263 |
| 9,905,254 B1* | 2/2018 | Ramakrishnan | G11B 5/4853 |
| 9,905,255 B1* | 2/2018 | Ramakrishnan | G11B 5/4853 |
| 9,978,412 B1* | 5/2018 | Macken | G11B 5/6088 |
| 10,186,291 B1* | 1/2019 | Ramakrishnan | G11B 5/607 |
| 10,229,706 B1* | 3/2019 | Macken | G11B 5/6005 |
| 10,410,660 B1* | 9/2019 | Hutchinson | G11B 5/4866 |
| 10,410,663 B1* | 9/2019 | Macken | G11B 5/3945 |
| 10,566,013 B1* | 2/2020 | Honda | G11B 5/012 |
| 2006/0030844 A1 | 2/2006 | Knight et al. | |
| 2006/0171076 A1* | 8/2006 | Lille | G11B 5/4853 360/234.5 |
| 2007/0177305 A1 | 8/2007 | Araki et al. | |
| 2007/0230056 A1 | 10/2007 | Beach et al. | |
| 2009/0040645 A1* | 2/2009 | Shimazawa | G11B 5/02 360/59 |
| 2011/0228651 A1* | 9/2011 | Gage | G11B 5/4866 369/13.24 |
| 2012/0120519 A1* | 5/2012 | Kunkel | G11B 5/607 360/59 |
| 2012/0307605 A1 | 12/2012 | Zhang et al. | |
| 2013/0265863 A1 | 10/2013 | Zhang et al. | |
| 2013/0286802 A1 | 10/2013 | Kiely | |
| 2014/0153130 A1* | 6/2014 | Garzon | G11B 5/607 360/75 |
| 2014/0269238 A1 | 9/2014 | Kautzky et al. | |
| 2015/0103430 A1* | 4/2015 | Gadbois | G11B 5/4853 360/59 |
| 2015/0103443 A1 | 4/2015 | O'Konski et al. | |
| 2017/0032810 A1* | 2/2017 | Macken | G11B 5/4853 |

* cited by examiner

BOND-PAD SHARING FOR HEAD-LEVEL THERMOCOUPLE

BACKGROUND

The present invention is directed to the fabrication and structure of head sliders for use in storage devices, such as hard-disk drives (HDDs), and in particular the provision and usage of electrical bond-pads on a slider surface structure to accommodate needs of slider design and fabrication processes as well as slider operation within a storage device.

Head sliders (sliders, for short) are fabricated for utilization within HDDs for positioning a magnetic head including, e.g., read and write elements, relative to one or more medium, such as spinning magnetic disks. Each slider typically includes read elements and write elements along with electrical contacts to facilitate electrical connection with an electronic data control system. Sliders are also provided with air-bearing features that controllably guide the manner by which the slider flies at a "fly height" on an air bearing created by a spinning magnetic disk. Specifically, the aerodynamic properties of the slider topography can influence the fly height, pitch, roll, and other important features of the slider. These features of the slider can range in size from nanometer size to millimeter size. Sliders may include writers, read elements (e.g., readers), grounds, and/or various heaters used to modulate the distance of the slider from a disk contained in an HDD by using thermal expansion properties of the materials that compose the slider and/or the disk.

Typically, a separation distance between the slider, which contains the read and write elements (e.g., transducers) and the air-bearing features, and a spinning magnetic disk medium is ten nanometers (nm) or less. The separation distance in this context is generally referred to as the fly height or head-to-media spacing. In order to improve data storage areal density, it is generally desirable to reduce the separation distance. One way to increase performance and to allow for reduced separation distance is to better flatten or reduce the roughness or imperfections of certain of the slider element surfaces, namely the air-bearing surface (ABS). Moreover, smaller and smaller sliders are being designed to fly closer to the disk, and more and more electronic functionality is desired.

The fabrication process of a slider typically includes a multitude of steps involving a high level of complexity, low tolerances, and small size specifications. Process steps can include fine line photolithography, reactive ion etching, ion milling, thin film deposition, among others. The sliders may include a substrate portion, an insulator layer, and a multi-layer thin film portion that includes various operative layers and elements of the slider, such as read and write transducers, heater elements, laser elements, and others, as are known and developed. The sliders are generally fabricated utilizing well-known wafer build techniques.

Sliders can also include a trailing edge that contains a plurality of bond-pads for electrical connections. With the addition of new functionality and features, there is becoming a greater desire for more bond-pads for device interconnection. Simultaneously, less area for these bond-pads may be available as sliders continue to shrink in size to accommodate higher density of data storage and smaller form-factor HDDs. A need for increased quantity of devices and functionality, and a shortage of space for additional bond-pads can lead to a desire to make better or more efficient use of existing bond-pads and available slider surface area in general.

SUMMARY

Aspects of the invention described herein are directed to an apparatus, as well as methods of making and methods of using the apparatus. The apparatus includes a slider configured for heat-assisted magnetic recording, the slider comprising an air bearing surface (ABS), a writer, a reader, and a plurality of electrical bond-pads. The apparatus also includes a first component situated at the ABS of the slider proximate the reader and operatively coupled to a first pair of the plurality of electrical bond-pads, the first component being a thermocouple configured to sense for a thermal aspect of a magnetic recording medium surface. According to aspects of the invention, the slider is configured to share at least one bond-pad by operatively coupling a second pair of the plurality of electrical bond-pads to a second component, and the slider is configured to selectively utilize the thermocouple and the second component.

These and various other features and advantages will be apparent from a reading of the following detailed description.

BRIEF DESCRIPTION OF THE DRAWINGS

Other important objects and advantages of the present invention will be apparent from the following detailed description of the invention taken in connection with the accompanying drawings.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present invention is directed to the fabrication and structure of head sliders for use in storage devices, such as hard-disk drives (HDDs), and in particular the provision and usage of electrical bond-pads on a slider surface structure to accommodate needs of slider design and fabrication process as well as slider operation within a heat-assisted magnetic recording (HAMR) device.

Embodiments of the present disclosure relate to setting clearance, head-to-medium spacing/contact detection, and laser power monitoring in data storage devices or drives that employ HAMR, also referred to as energy-assisted magnetic recording (EAMR), thermally-assisted magnetic recording (TAMR), and thermally-assisted recording (TAR). This technology uses a laser source and a near-field transducer (NFT) to heat a small spot on a magnetic disk medium during recording. The heat lowers magnetic coercivity at the spot, allowing a write transducer to change the orientation of a magnetic domain at the spot. Due to the relatively high coercivity of the medium after cooling, the data is less susceptible to paramagnetic effects that can lead to data errors.

Figure 1:
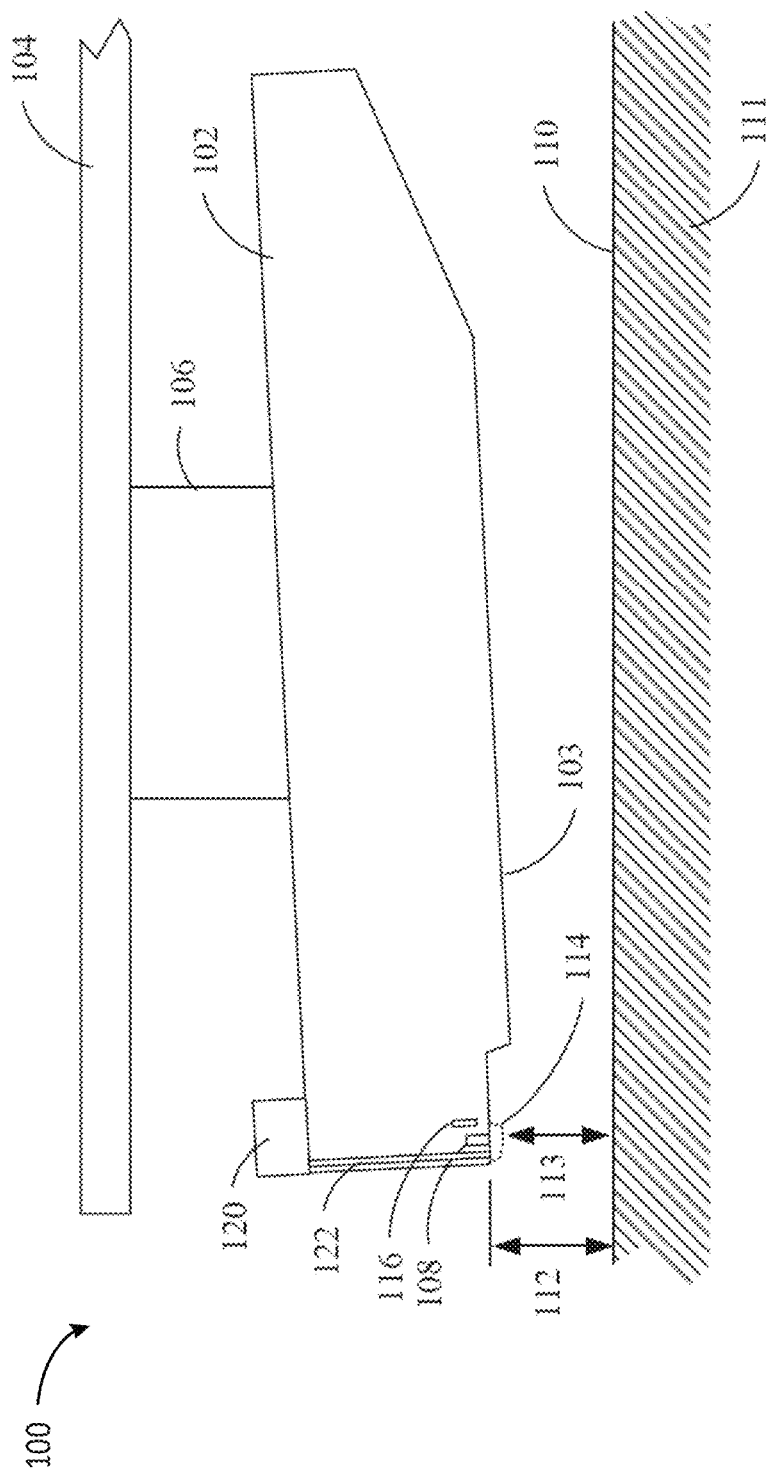
FIG. 1 is a schematic representation of a slider configured for heat-assisted magnetic recording (HAMR) in which the various embodiments disclosed herein may be implemented.

Referring now to FIG. 1, a schematic block diagram shows a side view of a recording head arrangement 100 including a slider 102 according to a representative embodiment. The slider 102 may be used in a magnetic data storage device, e.g., an HDD. The slider 102 may also be referred to herein as a recording head, a write head, or a read/write head. The slider 102 is coupled to a head suspension assembly 104 by way of a slider bond-pad 106 or other connection that allows some relative motion between the slider 102 and suspension 104. The slider bond-pad 106 can be similar to various other bond-pads described herein. The slider 102 includes read/write transducers 108 at a trailing edge that are held proximate to a surface 110 of a magnetic recording medium 111, e.g., magnetic disk. The slider 102 is configured as a HAMR recording head, which includes a laser 120 (e.g., a laser diode or other energy source) and a waveguide 122. The waveguide 122 delivers light from the laser 120 to components near the read/write transducers 108.

When the slider 102 is located over surface 110 of recording medium 111, a fly height 112 is maintained between the slider 102 and the surface 110 in part by a downward bias of suspension 104. This downward force is counterbalanced by an air cushion that exists between the surface 110 and an air bearing surface (ABS) 103 (also referred to herein as a "medium-facing surface") of the slider 102 when the recording medium 111 (e.g., disk) is rotating. It is desirable to maintain a predetermined slider fly height 112 over a range of disk rotational speeds during both reading and writing operations to ensure consistent performance. Region 114 is a "close point" of the slider 102, which is generally understood to be the closest spacing between the read/write transducers 108 and the recording medium 111, and generally defines the head-to-medium spacing 113.

Generally, recording heads may utilize heaters for fine control of head-to medium spacing 113. The heaters heat a portion of the recording head that faces a recording medium 111. The heating causes a local protrusion (an example of a thermal aspect, as used herein) due to thermal expansion of the material. The thermal protrusion can be finely controlled to maintain a desired clearance between a slider (which supports one or more writers and one or more readers) and the recording medium 111 (e.g., the head-to-medium spacing 113). The regions subject to thermal protrusion control typically include a region proximate the writer and, in some implementations, a region proximate the reader(s). Each of these regions, when thermally activated, becomes a so-called "close point" relative to the recording medium 111.

To account for both static and dynamic variations that may affect slider fly height 112, the slider 102 may be configured such that a region 114 of the slider 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116.

Figure 2:
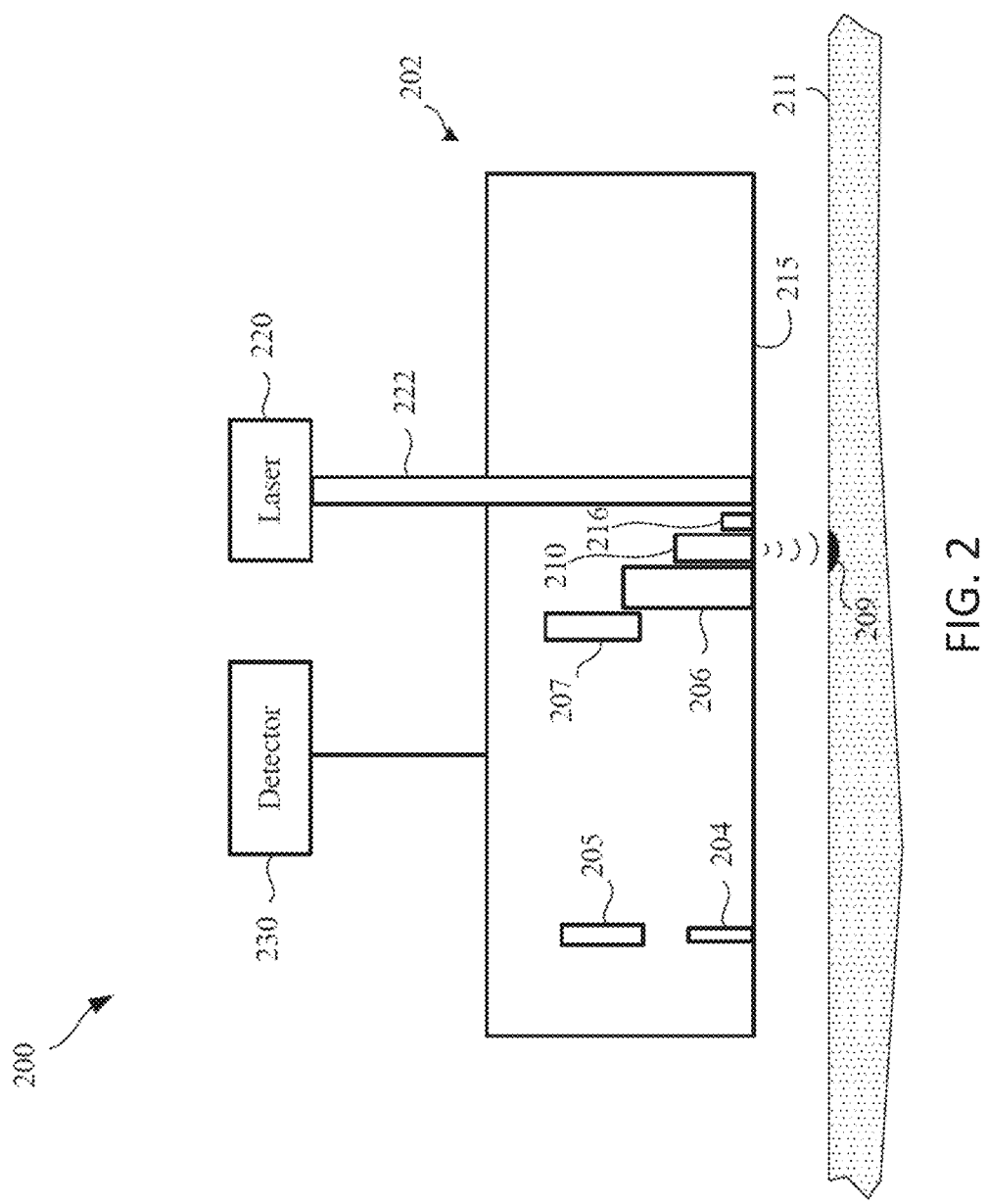
FIG. 2 shows a recording head arrangement configured for HAMR in accordance with various embodiments.

FIG. 2 shows a recording head arrangement 200 configured for HAMR in accordance with various embodiments. The recording head arrangement 200 includes a slider 202 positioned proximate a (e.g., rotatable or otherwise movable) magnetic medium 211. The slider 202 includes a reader 204 and a writer 206 proximate an air-bearing surface (ABS) 215 for respectively reading and writing data from/to the magnetic medium 211. The writer 206 is located adjacent an NFT 210 which is optically coupled to a light source 220 (e.g., a laser diode) via a waveguide 222. The NFT 210 can be coupled to the light source 220 by light from the light source 220 impinging on the NFT 210 and exciting the NFT 210 into a plasmonic state. The light source 220 can be mounted externally, or integral, to the slider 202. The light source 220 energizes the NFT 210 via the waveguide 222. According to various embodiments, the waveguide 222 forms a high-efficiency light transmission path between the light source 220 and the NFT 210 as a target. A transparent thermocouple 216, the purpose for which and embodiments of which are described in greater detail below, is shown situated proximate the NFT 210. A detector 230 can be operatively (e.g., electrically) coupled to the slider 202 and, more particularly, to the transparent thermocouple 216.

In some embodiments, the transparent thermocouple 216 incorporates two dissimilar elements that form a junction, where each of the two elements can be optically transparent. In other embodiments, one of two dissimilar elements that form the junction is optically transparent, while the other element is an existing component of the slider 202, such as the NFT 210. Because one of the elements is a pre-existing (and possibly non-transparent) component of the slider 202 and the other element is optically transparent, this configuration can be considered a transparent thermocouple because only optically transparent elements are being introduced into the slider 202. As such, both configurations are referred to herein as transparent thermocouples.

The transparent thermocouple 216 can produce an open circuit voltage when junction temperature terminals of the arrangement (e.g., a circuit) reach a temperature or other threshold or level, and the open circuit voltage can be at a single level or variable depending on implementation. The open circuit voltage produced by the transparent thermocouple 216 can then be used by the detector 230 for one or more of measuring relative or absolute temperature near or at the NFT 210, determining fly height and/or contact between the slider 202 and the magnetic medium 211 at a close point that includes the NFT 210, and monitoring output optical power of the light source 220.

The transparent thermocouple 216 is preferably situated at a location of the slider 202 that is subject to laser-induced writer protrusion, which is described below with reference to FIG. 3. The writer 206 includes a corresponding heater 207, and the reader 204 includes a corresponding heater 205 according to various embodiments. The writer heater 207 can be powered to cause protrusion of the ABS 215 predominately in the ABS region at or proximate the writer 206, and the reader heater 205 can be powered to cause protrusion of the ABS 215 predominately in the ABS region at or proximate the reader 204. Power can be controllably delivered independently to the heaters 207 and 205 to adjust the fly height (e.g., clearance) of the slider 202 relative to a surface of the magnetic medium 211. The fly height of the slider 202 can be determined using a fly height sensor, described in greater detail, below.

In order to establish an appropriate or optimal dynamic clearance for the slider 202, it is desirable to measure fly height at the close point or points, since these regions are closest to the magnetic medium 211 when thermally actuated. Further, while conventional sliders may be allowed to contact the magnetic medium 211 under some conditions, a HAMR drive (or, more generally, a HAMR device) may be damaged if such contact occurs while recording. This can make the estimation and control of head-to-medium spacing 113 (e.g., 113 of FIG. 1, dynamic clearance, fly height) and setting clearance more difficult in a HAMR recording head. The introduction of optical components in HAMR sliders (e.g., 202) can complicate head-to-medium spacing 113 and contact detection due to the physical presence and heat generated by the optical components.

For example, in a HAMR slider 202, the location of a fly height sensor is restricted to areas outside of the optical path in order to ensure light delivery to the NFT 210 is not degraded by the presence of the fly height sensor. Ideally, any sensor designed for head-to-media interaction would be at the close point of the recording transducer, which for current HAMR transducers is preferably at the NFT 210 and write pole. However, based upon the desire that the fly height sensor not compromise light delivery, fly height sensors are typically spaced more than 1 μm from the NFT 210 and write pole.

A HAMR device can use the light source 220 (e.g., a laser diode) to heat the magnetic medium 211 to aid in the recording process. The light source 220 generates heat and is also heated by other components (writer, reader, heater elements) in the slider 202. During write operation, for example, light source 220 heating can vary the junction temperature of the light source 220, causing a shift in laser emission wavelength, leading to a change of optical feedback from the optical path in the slider 202 to the cavity of the light source 220, a phenomenon which can lead to mode hopping/power instability of the light source 220. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in light source 220. Mode hopping can be problematic for HAMR applications, as mode hopping can lead to laser output power jumping and magnetic transition shifting from one block of data to another. Large transition shifts in a block of data may not be recoverable by channel decoding, resulting in error bits.

Monitoring of laser (or other light) power is important to ensure proper operation of the light source 220 and to avoid instabilities such as mode hopping. Example laser power monitoring involves use of an external photodiode situated on a submount that also supports the light source 220. The photodiode senses optical power output of the light source 220, and can be used to determine if the laser performance is sufficiently stable to ensure adequate writing performance. However, contemplated HAMR device slider designs may not provide sufficient room to include an external photodiode due to reduced submount dimensions.

Adequate head-to-medium contact detection response remains important to HDD development. For HAMR devices, it can also be important to detect small fluctuations in laser output optical power delivered to the NFT 210 while minimizing any light delivery losses. Typically, an electrical element such as an internal laser power monitor (e.g., a photodiode) would require extra, dedicated electrical bond-pads for electrical connections to the various electrical elements. Since additional bond-pads add cost and complexity to the head gimbal design and assembly, as described above, it is desirable to provide both sensing of head-to-medium interactions and laser/light source output optical power without the need for additional bond-pads. Proposed solutions involve the sharing of one or more slider bond-pads.

A HAMR device can utilize the types of optical devices described above to heat the magnetic medium 211 in order to overcome superparamagnetic effects that limit the areal data density of typical magnetic medium (e.g., disk). When writing with a HAMR device, electromagnetic energy is concentrated onto a small hot spot 209 over the track of the magnetic medium 211 where writing takes place, as shown in FIG. 2. The light from the light source 220 propagates to the NFT 210, e.g., either directly from the light source 220 or through a mode converter or by way of a focusing element. A mode converter, as used herein, can affect a light mode, including a transverse electric (TE) mode, where no electric field is present in the direction of propagation, or a transverse magnetic (TM) mode, where no magnetic field is present in the direction of propagation. One or more focusing elements can be employed to deflect light beams from light source 220 in order to converge on a particular focal point with increased or otherwise modified intensity.

Other optical elements, such as couplers, mirrors, prisms, etc., may also be formed integral to the slider 202. As a result of what is known as the diffraction limit, optical components cannot be used to focus light to a dimension that is less than about half the wavelength of the light. The lasers used in some HAMR device designs produce light with wavelengths on the order of 700-1550 nm, yet the desired hot spot 209 is preferably on the order of 50 nm or less. Thus, the desired hot spot size is well below half the wavelength of the light. Optical focusers cannot typically be used to obtain the desired hot spot size, being diffraction limited at this scale. Therefore, the NFT 210 can preferably be employed to create a hot spot 209 on the magnetic medium 211. The optical energy applied can excite surface plasmons of the NFT 210. NFT 210 surface plasmons are typically based on an oscillation of an electrical charge, and optical diffuser diffraction limits may therefore cease to be a constraint in some cases.

The NFT 210 is preferably a near-field optics device configured to generate local surface plasmon resonance at a designated (e.g., design) wavelength. The NFT 210 is generally formed from a thin film of plasmonic material (e.g., gold, silver, copper) on a substrate. In a (HAMR device) slider 202, the NFT 210 is positioned proximate the write pole of the writer 206. The NFT 210 is preferably aligned with the plane of the ABS 215 parallel to the read/write surface of the magnetic medium 211. The NFT 210 can achieve surface plasmon resonance in response to incident electromagnetic energy from, e.g., light source or laser 220. The plasmons generated by this resonance can be emitted from the NFT 210 towards the magnetic medium 211 where they are absorbed to create the hot spot 209. At the surface plasmon resonance, a high electric field surrounds the NFT 210 due to the collective oscillations of electrons at the typically metal surface (e.g., substrate) of the magnetic medium 211. At least a portion of the electric field surrounding the NFT 210 can be absorbed by the magnetic medium 211, thereby raising the temperature of the spot 209 on the medium 211 as data is being recorded.

As discussed above, laser light produced by the light source 220 can be coupled to the NFT 210 via the waveguide 222. The NFT 210, in response to the incident laser light, generates a high power density in a near-field region that is directed to the magnetic storage medium 211. This high power density in a near-field region of the NFT 210 causes an increase in local temperature of the medium 211, thereby reducing the coercivity of the magnetic material for writing or erasing information to/at the local region of the medium 211. A portion of the laser light energy communicated to the NFT 210 is absorbed and converted to heat within the slider 202. This heating results in thermal expansion of the ABS materials, protrusion at the ABS 215, and a change in both head-to-medium clearance and head-to-medium spacing 113. In addition to the NFT 210, the slider 202 typically includes additional heat sources, as noted above, that can selectively cause further thermal expansion and protrusion of the ABS 215. Such additional heat sources, when active, include one or more of the writer 206 (writer coil), writer heater 207, and reader heater 204.

Accurate determination of the clearance between the NFT 210 and the surface of the recording medium 211 at an operational write protrusion (an example of a thermal aspect) can be a challenge due to the limited writer area that contacts the medium 211. A close point of the writer 206 can contact the medium 211 in order to minimize a clearance setting error and achieve a relatively low clearance. According to various embodiments, it is generally preferred that the NFT 210 and close point be coincident. Traditional temperature-based contact detection methods are not sufficient for detecting NFT-to-medium contact because conventional resistance thermometer elements or bolometers, such as the resistive devices with a high thermal coefficient of resistance (TCR), are metallic and thus cannot typically be located close to the optical path due to parasitic light absorption. The spatial separation between the NFT 210 and the resistance thermometer can prevent accurate determination of the temperature of the NFT 210.

Disclosed are techniques for detecting HAMR device writer contact and/or spacing locally and measuring the NFT temperature in situ by co-locating an optically transparent thermal element with the NFT 210 and/or optical waveguide 222. Embodiments are directed to an optically transparent thermocouple that can withstand high temperatures associated with NFT excitation (e.g., up to about 450° C.) and does not degrade the light path or optics within the slider (e.g., has no or only a negligible impact on the performance of the NFT 210). For example, embodiments of a transparent thermocouple can be positioned relative to the NFT 210 so that only a small increase (e.g., 5% or less) in the temperature at a "peg" region of the NFT 210 results, if at all. Embodiments are directed to a transparent thermocouple that can be implemented as a multi-purpose device for setting NFT/write pole clearance, monitoring laser power, and measuring NFT temperature. Some embodiments are directed to a transparent thermocouple that can provide absolute temperature measurements at the NFT 210.

Figure 3:
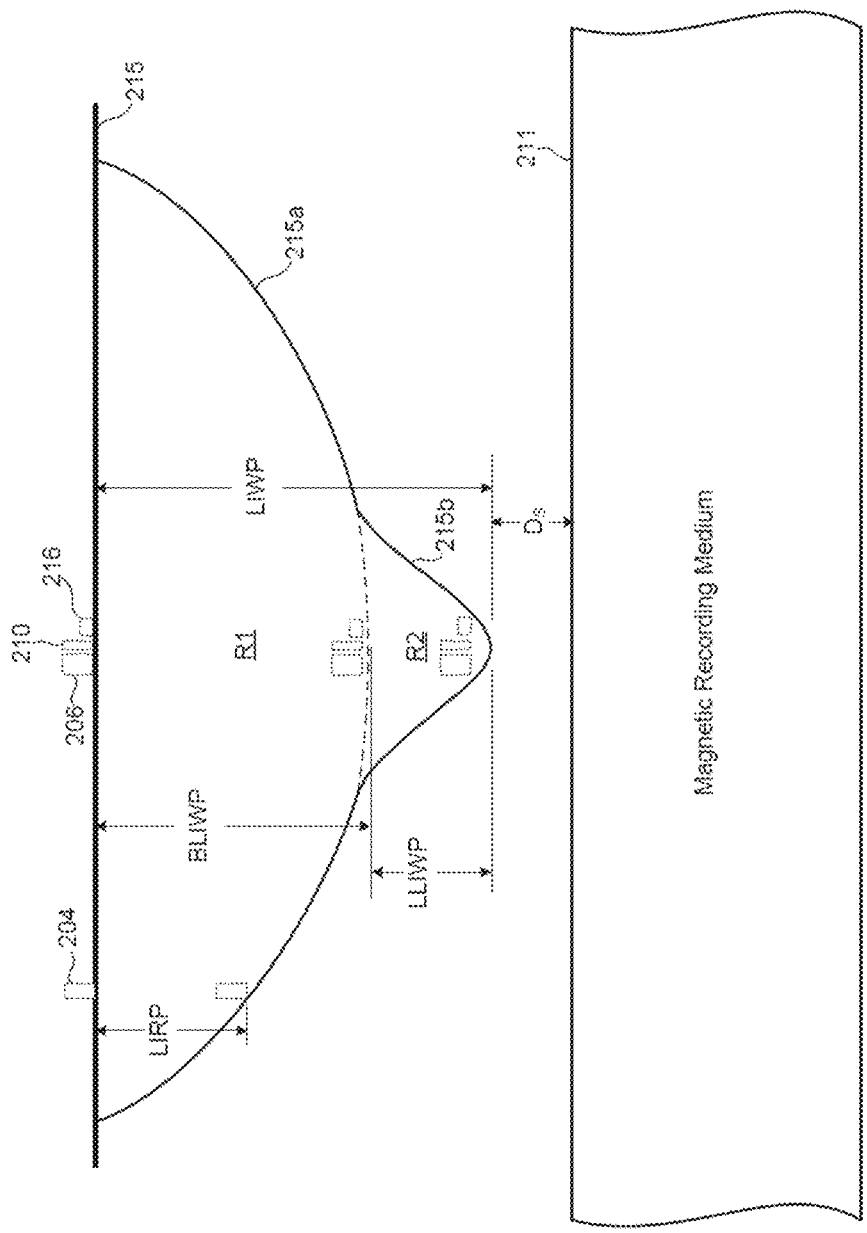
FIG. 3 is an exaggerated illustration of a laser-induced protrusion developed at an air bearing surface (ABS) of a HAMR slider in accordance with various embodiments.

FIG. 3 is an exaggerated illustration of a laser-induced protrusion (an example of a thermal aspect or thermal asperity, as used herein) developed at the ABS 215 of a HAMR device slider 202 in accordance with various embodiments. More particularly, the protrusion of the slider ABS 215 shown in FIG. 3 is referred to as Laser-Induced Writer Protrusion (LIWP). As shown in FIG. 3, the region of LIWP encompasses a writer 206, an NFT 210, and a transparent thermocouple 216 of the slider 202. LIWP represents the full excursion of the protrusion developed at the ABS 215 due to heating of the NFT 210 by excitation of the laser and other heat sources (e.g., the writer 206 itself and writer heater 207). It is noted that the reader 204 may also be subject to displacement by the ABS protrusion resulting from excitation of the laser of the slider 202. Protrusion of the slider ABS 215 due to laser/NFT heating in the region that encompasses the reader 204 is referred to as Laser-Induced Reader Protrusion (LIRP). Because the reader 204 is situated away from the NFT 210/writer 206, allowing for dissipation of laser-induced heat, LIRP is not typically as pronounced as LIWP. It is noted that the features shown in FIG. 3 are not drawn to scale.

LIWP is understood to include two protrusion components, which each can be a thermal aspect. The first component of LIWP is a broad protrusion component, referred to herein as Broad Laser-Induced Writer Protrusion (BLIWP). As the term indicates, a relatively broad region of the ABS 215 surrounding the writer 206 and NFT 210 expands to form a protruded region (volume) R1 in response to the heat generated by the NFT 210 and the writer 206 (and writer heater 207). The second component of LIWP is a local protrusion component, referred to herein as Local Laser-Induced Writer Protrusion (LLIWP). LLIWP is a smaller and narrower protrusion (relative to the BLIWP) that extends from the BLIWP in a direction towards the surface of the magnetic recording medium 211. As can be seen in FIG. 3, the BLIWP component encompasses a significantly larger volume (in region R1) of ABS material relative to that (in region R2) of the LLIWP component. Evaluation of experimental sliders has revealed that LIWP typically ranges between about 2 and 4 nm, while LLIWP typically ranges between about 1 to 2 nm (<2 nm).

As discussed, one function of an HDD is to accurately set the clearance between the slider and the surface of the magnetic medium 211 of the HDD in order to maintain the written bit size, and thus maintain areal bit density. Therefore, various techniques have been developed to set clearance that involve incrementally reducing fly height of the slider until contact is made between the slider and the magnetic medium 211. Once contact is made, an appropriate clearance is set such that slider is made to fly close to, but spaced apart from, the surface of the magnetic medium 211 during operation. Slider contacting the magnetic medium 211 (also known as head-to-medium contact or NFT-to-medium contact) can be set using thermal aspects, such as protrusions, thermal asperities, thermal differentials of the various components, etc., as described herein. A bolometer such as a TCR detector (e.g., a dual-ended thermal coefficient of resistance [DETCR] detector) can be located proximate the magnetic medium 211, where the magnetic medium 211 starts at a higher temperature than the DETCR, as the DETCR can include a bias leading to Joule heating. Upon the DETCR approaching the magnetic medium 211, there can be a cooling, followed optionally by friction upon the contact. This friction and/or cooling can be a result of a thermal aspect, as used herein. In various embodiments, the interface between cooling and friction components can be used to determine contact.

It can be appreciated that for HAMR device sliders, it is important to account for LIWP in order to avoid detrimental contact between the slider and the magnetic medium 211. Conventional clearance techniques use a resistive sensor situated away from the NFT 210/writer 206. As was previously discussed, a resistive sensor should not be located in the optical path due to parasitic light absorption, nor does a resistive sensor generally have the ability to withstand the high temperatures associated with NFT excitation. Because of these constraints, conventional clearance sensors are positioned well away from the ABS region of greatest protrusion, thereby preventing localized sensing of operational write protrusion needed for highly accurate clearance, fly height, and contact determinations.

Figure 4:
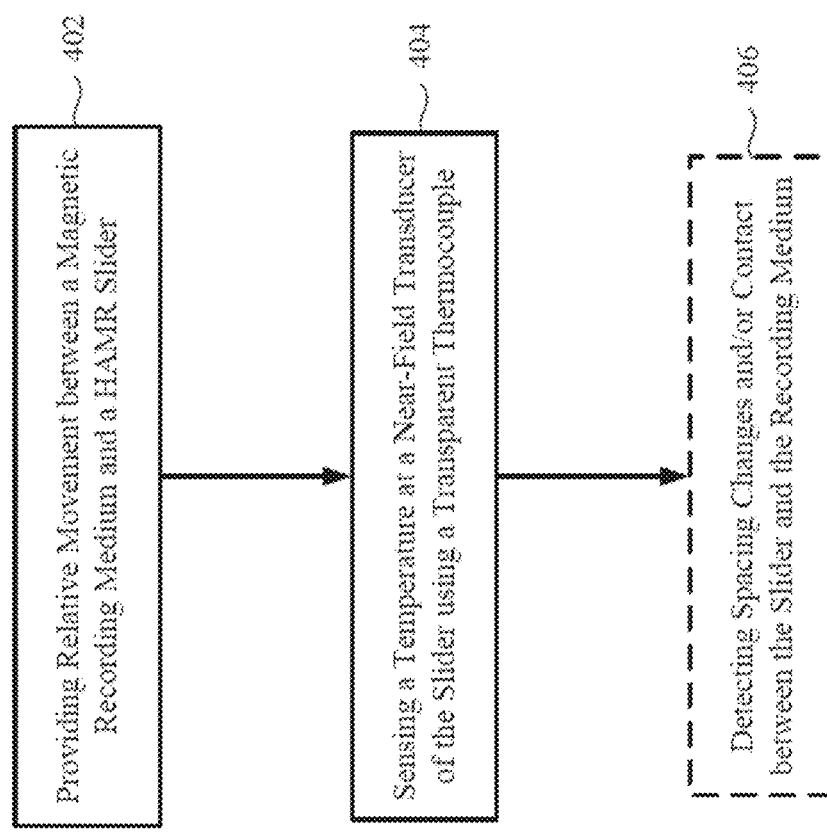
FIG. 4 illustrates various operations of a method for sensing temperature at a near-field transducer of a HAMR slider in accordance with various embodiments.

FIG. 4 illustrates various operations of a method for sensing temperature at a NFT of a HAMR device slider (e.g., slider 202), in accordance with various embodiments. The method shown in FIG. 4 can involve providing 402 relative movement between a magnetic recording medium (e.g., 211 of FIG. 2) and a HAMR device slider. The method can also involve sensing 404 a temperature at a NFT of the slider, such as using a transparent thermocouple. The method may also involve detecting 406 spacing changes and/or contact between the slider and the recording medium using a signal produced by the transparent thermocouple.

Figure 5:
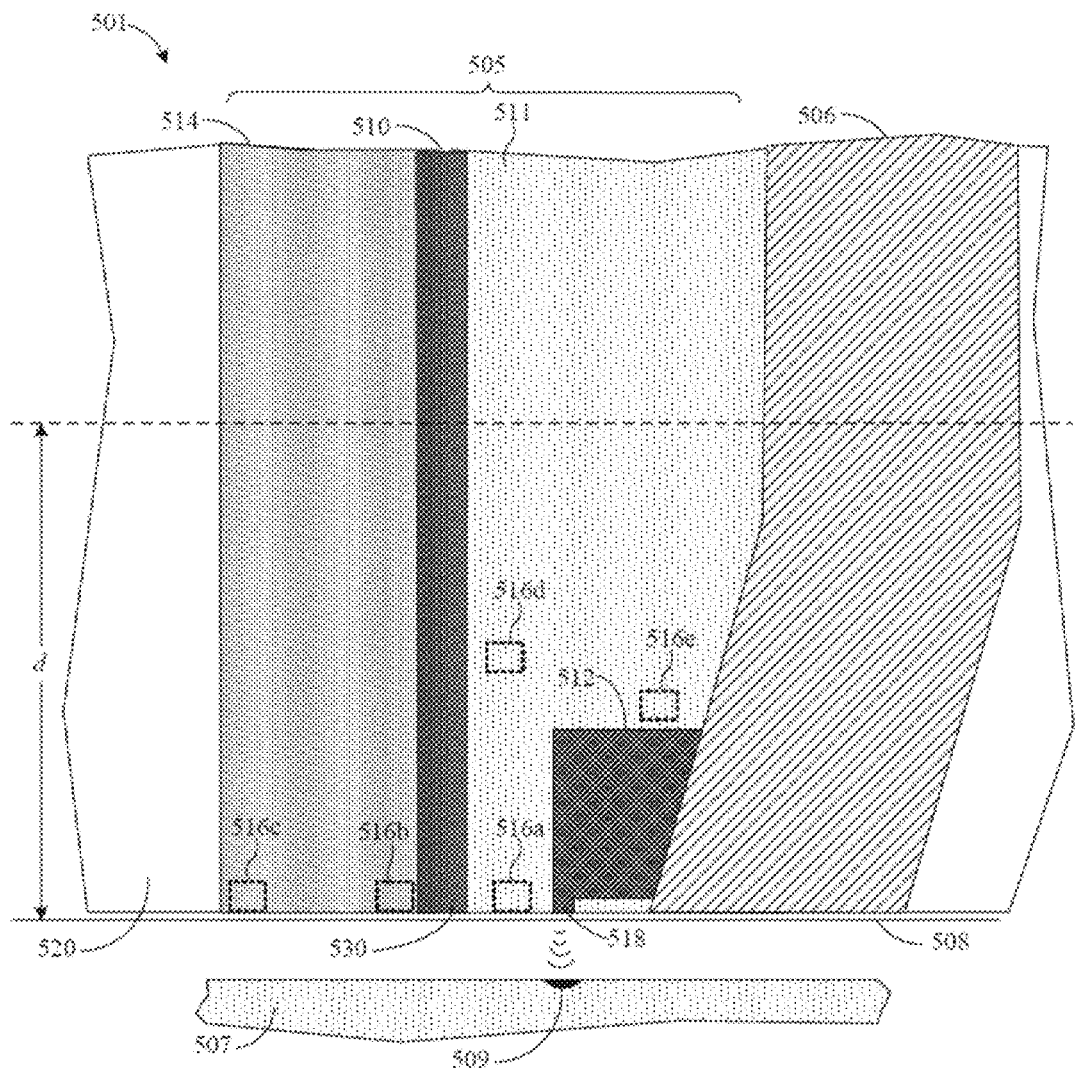
FIG. 5 is a cross-sectional view illustrating portions of a HAMR slider that includes a transparent thermocouple proximate a near-field transducer, according to various embodiments.

Turning now to FIG. 5, there is shown a cross-sectional view illustrating portions of a slider body 501 that include a NFT 512 (which can be similar to NFT 210) and a transparent thermocouple 516 according to a representative embodiment. The transparent thermocouple 516 can be placed in one or more different locations (shown as 516a, 516b, 516c, 516d, and/or 516e), according to various embodiments. In this view, the NFT 512 is shown proximate the ABS 508 of the slider body 501 and to a surface of magnetic recording medium 507, e.g., a magnetic disk. The NFT 512 shown in FIG. 5 is of an NTS (NFT "stadium style") design, which includes an enlarged region having a sloped planar upper surface (shown in contact with a magnetic write pole 506). It is noted that NFT 512 can be of a different design, such as a so-called lollipop or peg-only (e.g., nanorod) design, for example. As shown, a peg 518 extends from a lower enlarged region and terminates near or at the ABS 508. A width of peg 518, as shown, is preferably narrower than the rest of the NFT 512 since the peg 518 can define a written track width.

A waveguide 505 is operatively (e.g., electrically, optically, etc.) connected to deliver electromagnetic energy from a light source (e.g., laser 120 in FIG. 1, light source 220 of FIG. 2) to the NFT 512, which directs the energy to create a small hot spot 509 on the recording medium 507. The waveguide 505 includes a layer of core material 510 surrounded by cladding layers 511 and 514. A magnetic write pole 506 can cause changes in magnetic flux near the medium facing surface 508 in response to an applied current. Flux from the write pole 506 changes a magnetic orientation of the hot spot 509 as it moves past the write pole 506 in the downtrack direction. As shown, the write pole 506 can form part of an electrical pathway to complete a thermocouple circuit, as described herein. However, other suitable configurations could also be used to close the thermocouple circuit, as appropriate.

Still referring to FIG. 5, a transparent thermocouple 516 in shown in various locations, as such comprises components that are situated at different locations of the slider body 501. Transparent thermocouple at 516a, for example, is situated at, adjacent, or near the ABS 508 within cladding layer 511 and proximate the peg 518 of the NFT 512. Transparent thermocouple at 516b is situated at the ABS 508 within cladding layer 514 and adjacent the core layer 510. Transparent thermocouple at 516c, by way of further example, is situated within the cladding layer 514 and spaced away from the core layer 510. Although it is generally desirable to position the transparent thermocouple 516 at or near the ABS 508, experiments have demonstrated that accurate slider-medium spacing (e.g., 113) determinations can be made using the transparent thermocouple 516 located away from the ABS 508. For example, transparent thermocouple at 516d can be located in the cladding layer 511 adjacent the core layer 510 and spaced away from the ABS 508 by a distance, d, preferably of up to about 1.5 µm.

In the illustration shown in FIG. 5, transparent thermocouple at 516d is shown situated within the cladding layer 511, but not vertically above the NFT 512 and spaced away from the ABS 508. That distance can be a distance of about 0.8 µm. Transparent thermocouple at 516e is shown situated within the cladding layer 511 directly above the enlarged region of the NFT 512. It is understood that the transparent thermocouple 516 can be located at a variety of positions within the slider body 501, with a preference that it be located closer to, rather than further away from, the NFT 512. According to some embodiments, the transparent thermocouple 516 can have a cross-sectional area ranging from about 10 $nm^2$ to about 10 $µm^2$. For example, the transparent thermocouple 516 can be located at the ABS 508 (see, e.g., transparent thermocouple 516a) and have a cross-sectional area of about 2500 $nm^2$ (e.g., 50 nm×50 nm). As another example, the transparent thermocouple 516 can be located above the enlarged region of the NFT 512 (see, e.g., transparent thermocouple at 516e) and have a cross-sectional area of about 5000 $nm^2$ (e.g., 200 nm×25 nm). Greater dimension constraints of a thermocouple (e.g., 516a, 516b, or 516c) can occur as the thermocouple approaches the NFT 512.

Figure 6:
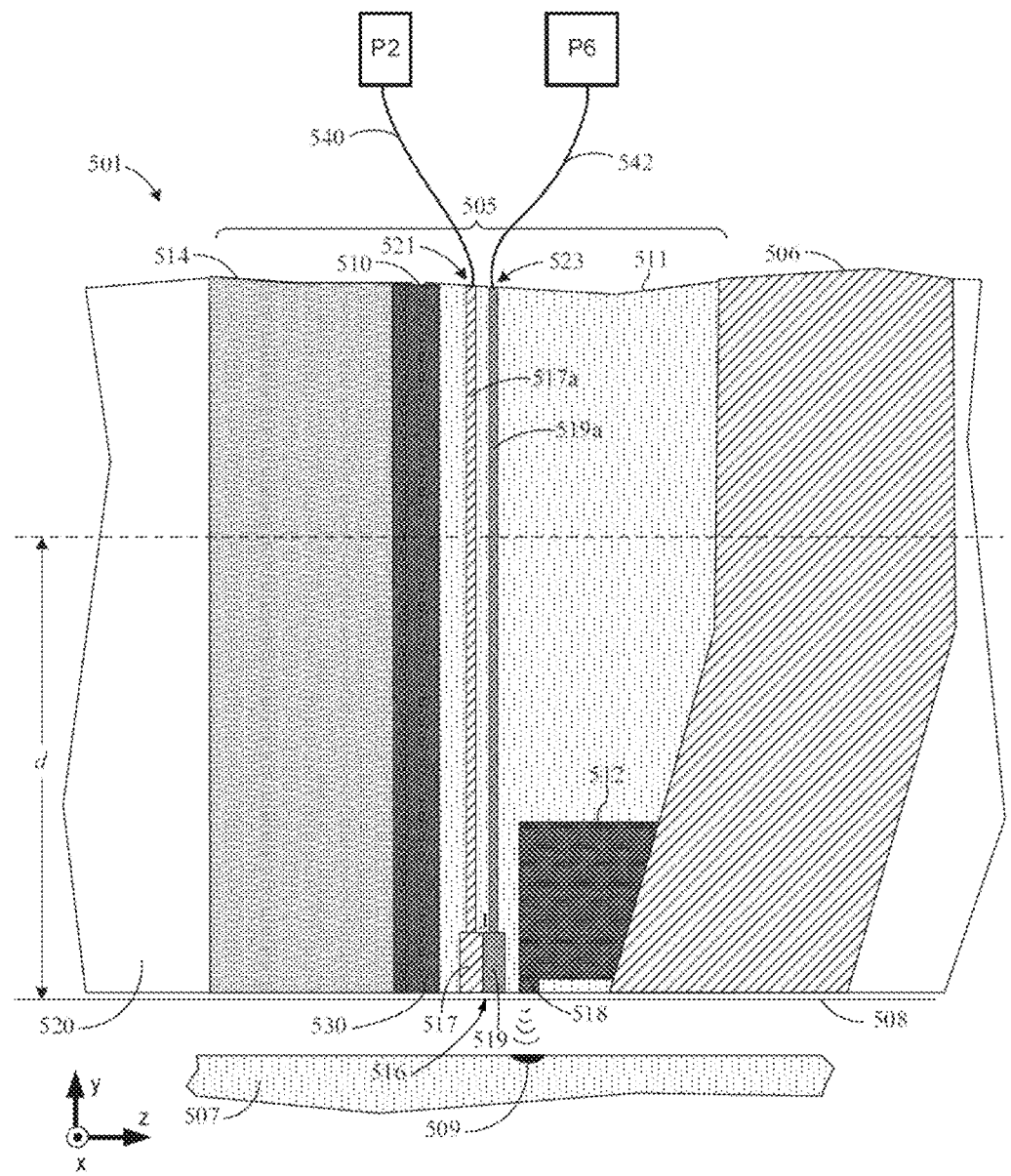
FIG. 6 shows a transparent thermocouple situated adjacent a near-field transducer in accordance with various embodiments.

FIG. 6 shows a transparent thermocouple 516 situated adjacent an NFT 512 in accordance with various embodiments. The transparent thermocouple 516 shown in FIG. 6 includes a first element 517 formed from a first optically transparent material and a second element 519 formed from a second optically transparent material. The first and second materials are dissimilar optically transparent conductive materials. For example, the first material can be a p-type material, and the second material can be an n-type material. Other types of first and second materials can be used that provide a difference in Seebeck coefficients (in µV/K). The first element 517 and the second element 519 form a junction, J, at or near the ABS 508 adjacent the peg 518 of the NFT 512. The junction, J, formed by the dissimilar first and second materials produces an electric potential related to the temperature at the NFT 512 (e.g., temperature adjacent the peg 518). As such, the junction, J, can be used as a thermometer to measure and monitor temperatures at the NFT 512. In some embodiments, the temperature measured by the transparent thermocouple 516 is a relative temperature. In other embodiments, the temperature measured by the transparent thermocouple 516 can be an absolute temperature. The temperature in various cases may not be generated by the thermocouple 516 since the thermocouple 516 may not readily absorb light. The thermocouple 516 can also undergo temperature changes resulting from nearby metals, etc.

The first element 517 preferably includes an elongated lead section 517a that extends in the y-direction away from the NFT 512. The second element 519 includes an elongated lead section 519a that extends in the y-direction away from the NFT 512. The lead section 517a is formed from the same material (a first optically-transparent material) as the first element 517, and the lead section 519a is formed from the same material (a second optically-transparent material) as the second element 519. At a location well away (in the y-direction) from the NFT 512, the lead section 517a is connected to a first conductor 540 at a first connection 521, and the lead section 519a is connected to a second conductor 542 at a second connection 523. The first conductor 540 is coupled to a first electrical bond-pad (e.g., P2) of the slider body 501, and the second conductor 542 is coupled to a second electrical bond-pad (e.g., P6). The first and second conductors 540 and 542 can be formed from copper (Cu), for example. The open circuit voltage of the thermocouple 516 can be measured as the potential between the two bond-pads, P2 and P6.

The lead section/conductor connections 521, 523 are preferably located far enough away from the NFT 512 that these connections are not substantially affected by the heat generated at the NFT 512. In some embodiments, the lead section/conductor connections 521, 523 are located at a location of the slider body 501 whose temperature is known, such as by use of another temperature sensor provided in or proximate the slider body 501. Use of another temperature sensor at or near the lead section/conductor connections 521, 523 allows for accurate measurement of the reference temperature at each of the lead section/conductor connections 521, 523, which effectively define ancillary junctions of the transparent thermal conductor 516. With the transparent thermocouple 516 properly calibrated, and with knowledge of the reference temperatures at the lead section/conductor connections 521, 523, the absolute temperature at the junction J can be determined using known techniques.

According to some embodiments, the first optically transparent material of the first element 517 is indium tin oxide (ITO), and the second optically transparent material of the second element 519 is indium oxide ($In_2O_3$). The Seebeck coefficient for the junction, J, is about 110 µV/K. According to other embodiments, the first optically transparent material of the first element 517 is ITO, and the second optically transparent material of the second element 519 is manganese-doped indium tin oxide (Mn:ITO). The Seebeck coefficient for the junction, J, formed from these materials is about 94 µV/K. According to further embodiments, the first optically-transparent material of the first element 517 is ITO, and the second optically-transparent material of the second element 519 is antimony-doped tin oxide (Sb:TO). The Seebeck coefficient for the junction, J, formed from these materials can range between about 7 and 77 µV/K. Each of the materials listed above is transparent to visible light and to the light wavelengths associated with heat-assisted magnetic recording (e.g., about 700-1550 nm, such as 830 nm).

Other optically transparent materials can be used to form the junction, J, of a transparent thermocouple incorporated in a slider (e.g., 202), such as near the NFT 512. Such materials include the following: ZnO, aluminum-doped zinc oxide (Al:ZnO or AZO), aluminum and gallium co-doped ZnO ceramics (AGZO), Zn co-doped ITO, fluorine-doped tin oxide (FTO); reduced (oxygen deficient) single crystal $TiO_2$, indium gallium zinc oxide (IGZO), $SnO_2$, $TiO_2$, $Ga_2O_3$, $CuAlO_2$, $Cu_2O$, $HfO_2$, MgO, and $SiO_2$. These and other optically transparent materials disclosed herein can be used in various combinations as materials used to form the junction, J, of the transparent thermocouple. Although any of the disclosed materials can be used together to form a transparent thermocouple, those that provide a greater difference in Seebeck coefficients can provide larger voltage signals. In some embodiments, and as discussed hereinbelow, a portion of the NFT 512 is used as one of the materials that form the junction, J, while any of the optically-transparent materials disclosed herein can be used as the other material used to form the junction, J. In general, higher performing transparent thermocouples include those that combine p-type materials with n-type materials. Examples of various p-type materials include $NiCo_2O_4$, $CuAlO_2$, $CuGaO_2$, $CuInO_2$, $SrCu_2O_2$, and LaCuOCh (where Ch represents chalcogen). Examples of various n-type materials include AZO and ITO, among others listed above.

Figure 7:
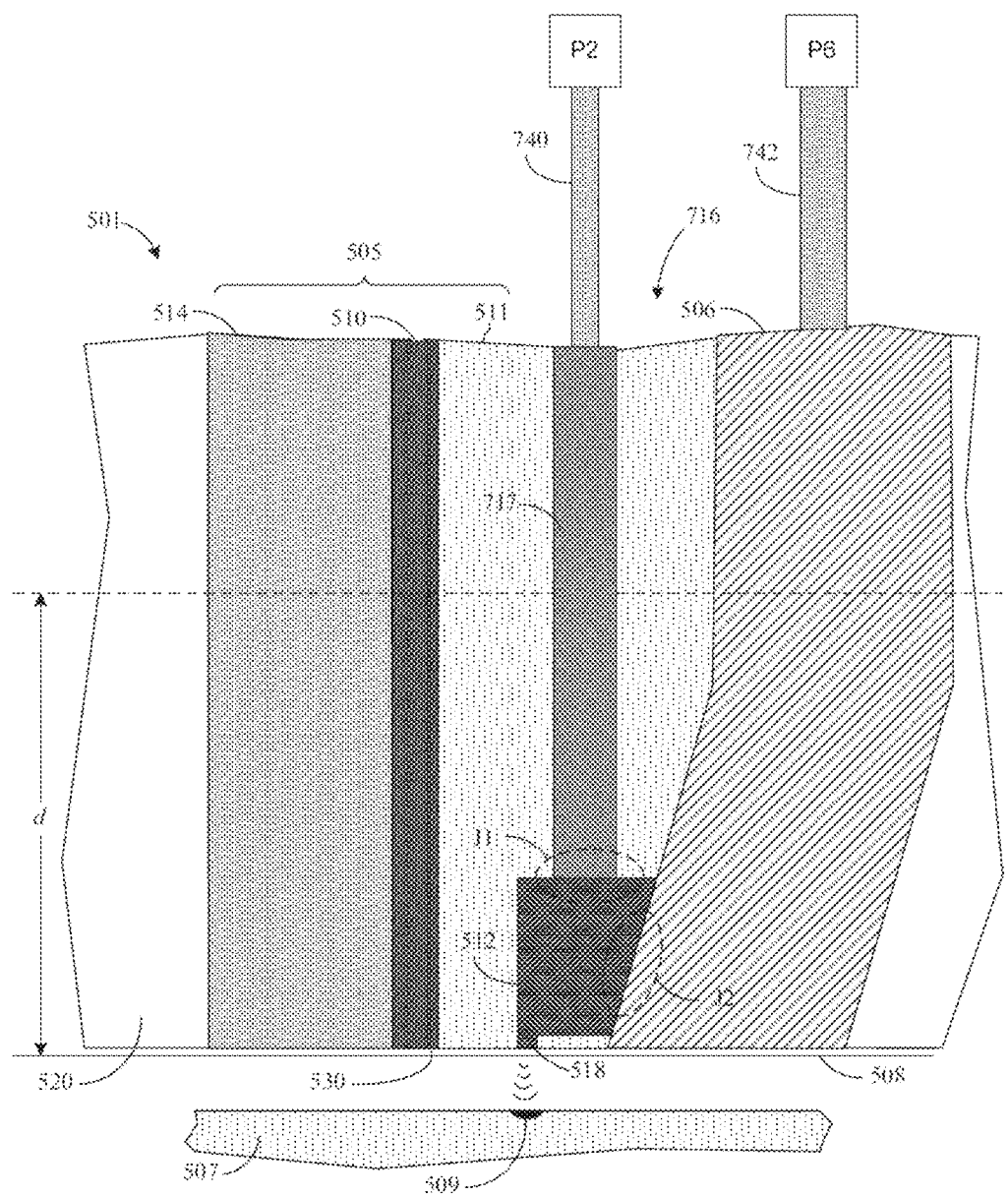
FIG. 7 shows a transparent thermocouple according to other embodiments implemented in the slider shown in FIG. 6.

FIG. 7 shows a transparent thermocouple 716 according to other embodiments implemented in the slider body 501 shown in FIG. 6. The transparent thermocouple 716 includes a first element 717 formed from a first optically transparent material and a second element defined by the NFT 512. The location at which the first element 717 connects to the NFT 512 defines a junction, J1, of the transparent thermocouple 716. The embodiment of the transparent thermocouple 716 shown in FIG. 7 provides for highly localized sensing of NFT temperature, since one element of the transparent thermocouple 716 is the NFT 512 itself. As was discussed previously, the thermocouple 716 shown in FIG. 7 can be considered to be "transparent" since the thermocouple 716 includes a transparent first element 717 and an existing component of the slider body 501, the NFT 512, as the second element. As such, the transparent thermocouple 716 is considered transparent because it does not introduce a non-optically-transparent element into the slider body 501.

The first element 717 is formed from a first optically-transparent material, such as IGZO, ITO, Mn:ITO, or Sb:TO. The NFT 512 can be formed from any plasmonic metal, such as Au, Ag, Cu, Al, Pt, Pd, and Rh, for example, or alloys of these metals. Each combination of these first and second materials can theoretically produce a sufficiently high Seebeck coefficient. A transparent thermocouple 716 including a first element 717 formed from Mn:ITO and the NFT 512 formed from Au, for example, can theoretically produce a very high Seebeck coefficient.

In the embodiment shown in FIG. 7, the first element 717 of the transparent thermocouple 716 extends from the junction, J1, at the NFT 512 to a location within the slider body 501 well away from the NFT 512 for similar reasons as have been discussed previously. The first element 717 is coupled to a first electrical bond-pad, P2, via a first conductor 740, which may be a copper conductor for example. The NFT 512 is electrically coupled to another electrical bond-pad, P6, via the write pole 506 and a second conductor 742 (e.g., a copper conductor). The location of the connection between the write pole 506 and the second conductor 742 can be well away from the NFT 512 also for the same reasons discussed previously. The connection between the NFT 512 and the write pole 506 can define a second junction, J2, of the transparent thermocouple 716. With respect to the second junction J2, both NFT 512 and write pole 506 can be metals with similar Seebeck coefficients, and as a result there may effectively be no reverse junction in some embodiments.

A thermocouple with two junctions J1 and J2 can produce on open-circuit voltage that is the net sum of the voltages produced by a thermocouple with junction J1 and a thermocouple with junction J2. Absolute voltage values can be material dependent and/or dependent upon various temperature differences. In some cases, depending on the polarity of the Seebeck coefficients of the materials including junctions J1 and J2, the net sum voltage of the thermocouple 716 will be lower than for a thermocouple including only junction J1 or only junction J2. In other cases, depending on the polarity of the Seebeck coefficients of the materials including junctions J1 and J2, the net sum of the thermocouple 716 voltage will be higher than for a thermocouple including only junction J1 or only junction J2. If the temperature at junction J1 is equivalent to the temperature at junction J2, the net thermocouple 716 will behave as if there is one junction of dissimilar materials between element 717 and write pole 506. For the embodiment shown in FIG. 7, it may be challenging to determine absolute temperature of the NFT 512 or NFT peg 518 without knowing the temperatures at junction J1 and junction J2, but the transparent thermocouple 716 would still function to measure relative temperature at the NFT 512, determine fly height and/or detect contact between the slider 501 and the recording medium 507 at a close point that includes the NFT 512, and monitor output optical power of the light source 220.

Figure 8:
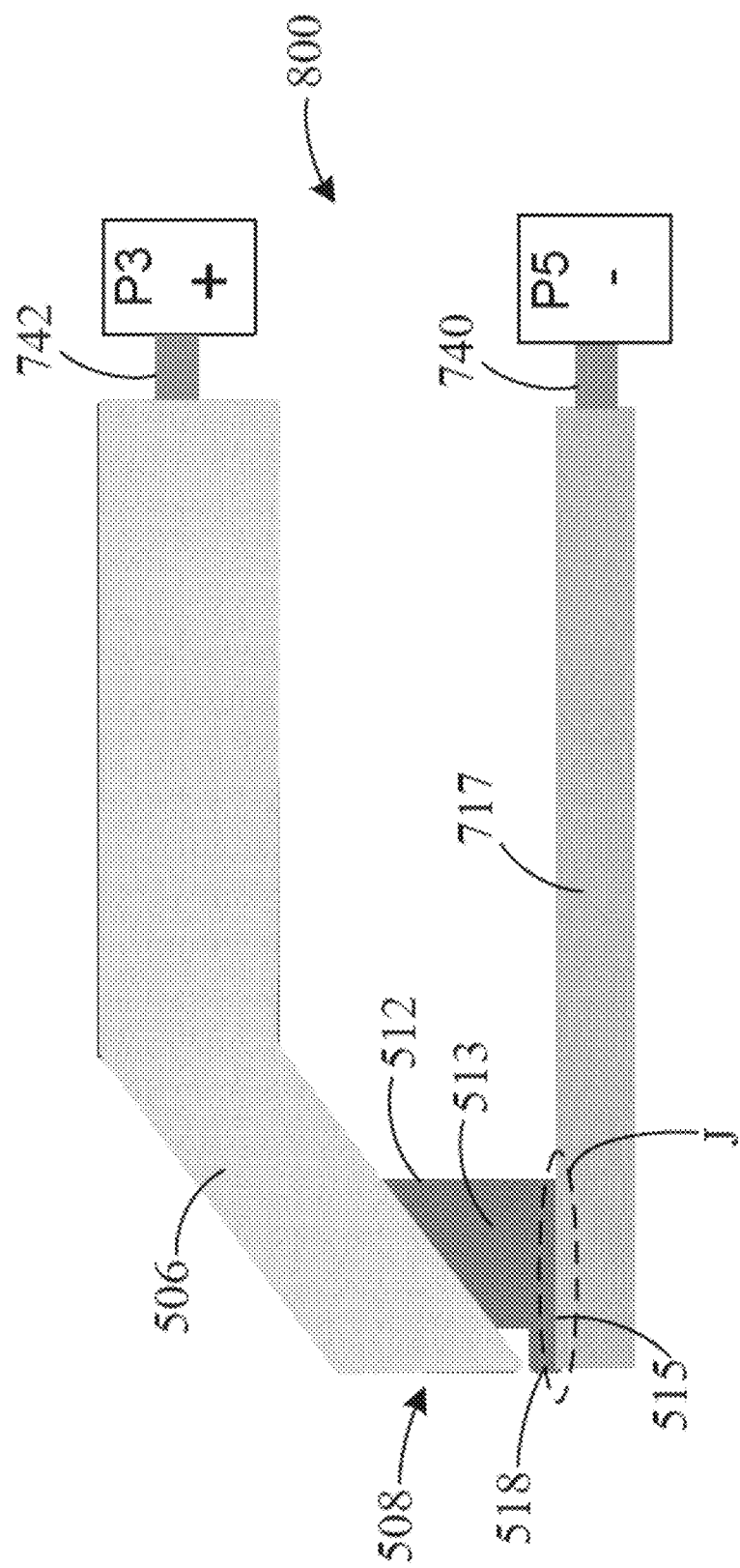
FIG. 8 schematically illustrates one example of a transparent thermocouple for use in a HAMR slider in accordance with various embodiments.

FIG. 8 schematically illustrates one example of a transparent thermocouple 800 for use in a HAMR device slider (e.g., 202) in accordance with various embodiments. The transparent thermocouple 800 includes a junction, J, formed between a transparent element 717 and portions of the NFT 512 that include an enlarged region 513 (e.g., a heat sink integral or coupled to the NFT 512) and the peg 518. The junction, J, is considered the primary junction at which the desired temperature is to be measured, it being understood that the thermocouple 800 includes other junctions that are accounted for in the implementation of the thermocouple 800. In the embodiment shown in FIG. 8, the transparent element 717 is formed along a first surface 515 of the NFT 512 that includes the peg 518. The transparent element 717 can extend along the entirety of the first surface 515 of the NFT 512 and terminate at the ABS 508 (e.g., extend as far as the terminal end of the peg 518). The NFT 512 shown is coupled to a first electrical bond-pad, P3 (+), via the write pole 506 and a first conductor 742. The transparent element 717 is shown coupled to a second electrical bond-pad, P5 (−), via a second conductor 740. It is noted that the transparent element 717 can be formed from any of the optically transparent materials of types previously described or as developed. An open circuit voltage can be measured as the potential between bond-pads P3 and P5.

Figure 9:
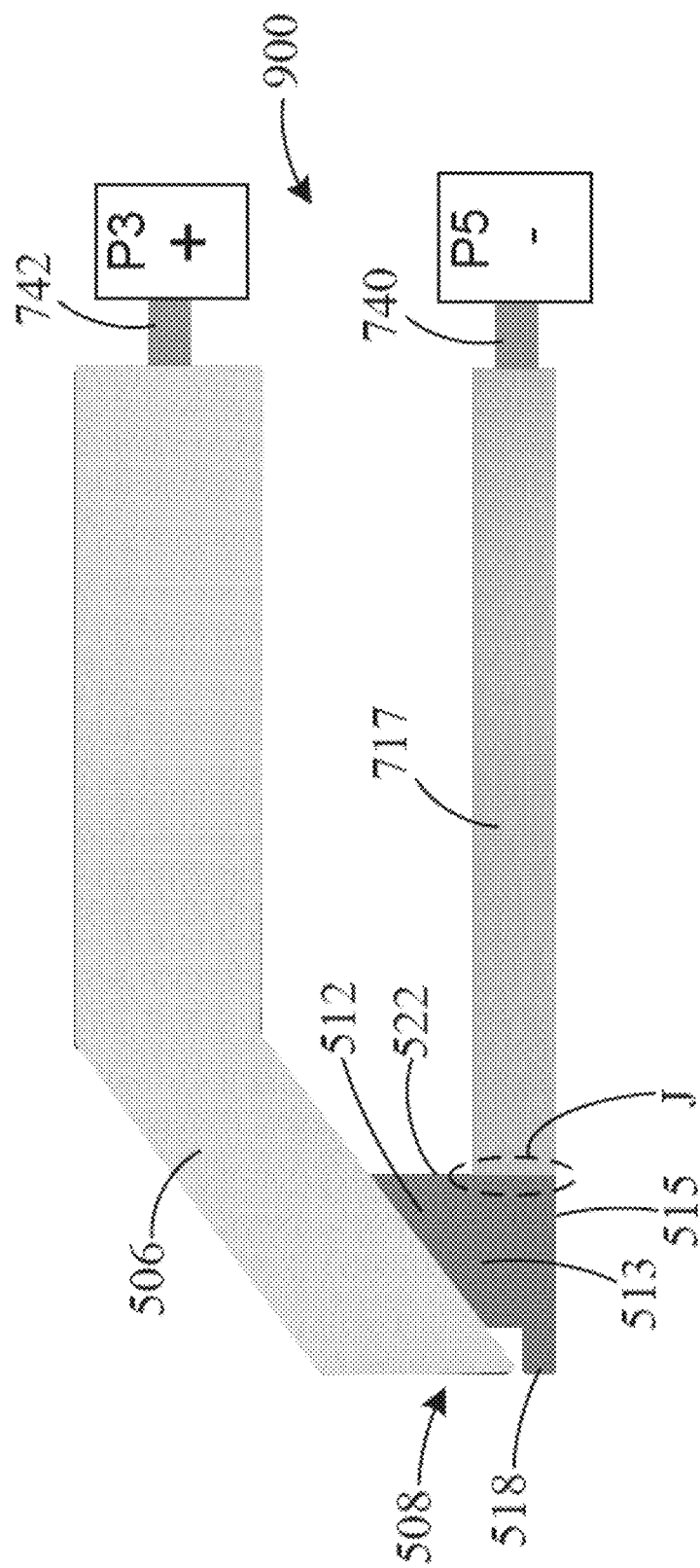
FIG. 9 schematically illustrates another example of a transparent thermocouple for use in a HAMR slider in accordance with various embodiments.

FIG. 9 schematically illustrates another example of a transparent thermocouple 900 for use in a HAMR device slider (e.g., 202) in accordance with other embodiments. The transparent thermocouple 900 shown in FIG. 9 includes features similar to those shown in FIG. 8, but differs in terms of the location of the junction, J. The junction, J, in the embodiment shown in FIG. 9 is formed between a transparent element 717 and a rear surface 522 (opposing the medium-facing surface) of the NFT 512. In the embodiment shown in FIG. 9, the transparent element 717 does not extend along the first surface 515 of the NFT 512. The transparent element 717 can be formed from an optically transparent material of a type previously described. The NFT 512 is coupled to a first electrical bond-pad, P3 (+), via a first conductor 742 and write pole 506, and the transparent element 717 is coupled to a second electrical bond-pad, P5 (−), via a second conductor 740. An open circuit voltage can be measured as the potential between bond-pads P3 and P5.

Figure 10:
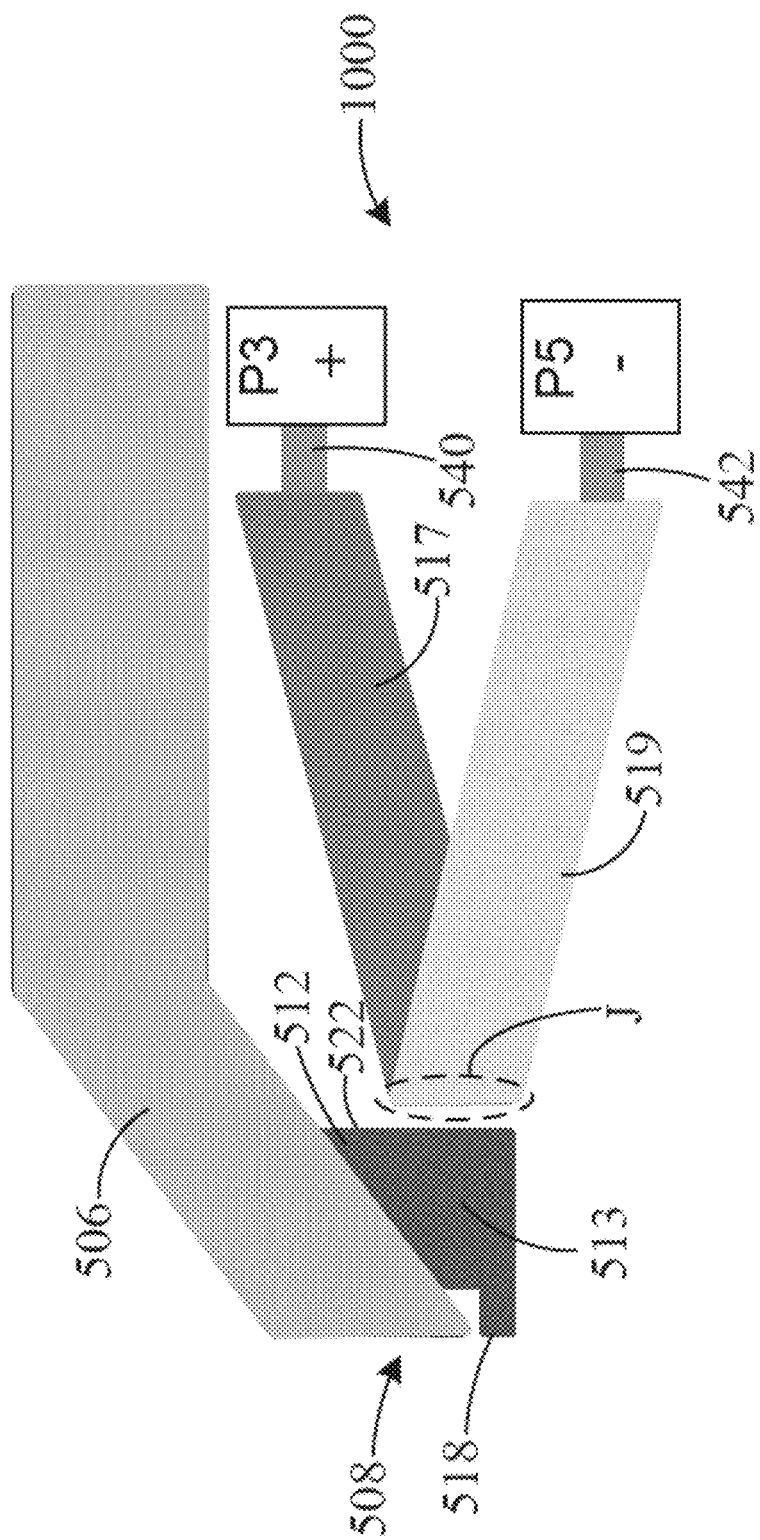
FIG. 10 schematically illustrates yet another example of a transparent thermocouple for use in a HAMR slider in accordance with various embodiments.

FIG. 10 schematically illustrates another example of a transparent thermocouple 1000 for use in a HAMR device slider (e.g., 202) in accordance with other embodiments. In the transparent thermocouple 1000 shown in FIG. 10, a junction, J, is formed between two dissimilar optically transparent elements 517 and 519. The junction, J, is situated adjacent a rear surface 522 of an enlarged region 513 of the NFT 512. The two dissimilar elements 517 and 519 can be formed from optically transparent materials previously described. A first transparent element 517 is coupled to a first electrical bond-pad, P3 (+), via a first conductor 540, and a second transparent element 519 is coupled to a second electrical bond-pad, P5 (−), via a second conductor 542. An open-circuit voltage can be measured as the potential between bond-pads P3 and P5, and write pole 506 can be left unutilized according to this embodiment.

Various embodiments of the subject disclosure are directed to a slider (e.g., 202) that incorporates a set of bond-pads coupled to bias sources and a multiplicity of electrical components coupled to the bond-pad set (see, e.g., bond-pad set 11 of FIGS. 13-16), where at least one of the bond-pads is shared between at least one of the electrical components and a transparent thermocouple. An issue with adding additional components or any electrical feature in general to an existing slider or head gimbal assembly (HGA) is the real estate required to place bond-pads, which allow access to these new features. Some slider form factors, for example, can accommodate nine bond-pads. In other sliders, a total of ten bond-pads is likely feasible. Any increase in bond-pad count above nine or ten (depending on the slider/HGA design) likely requires migration to a top bond-pad configuration, which is both more technically challenging and expensive. An alternative to adding an additional bond-pad above the designed-in pad count is for the transparent thermocouple to share an existing bond-pad with at least one other electrical device on the slider.

Figure 11:
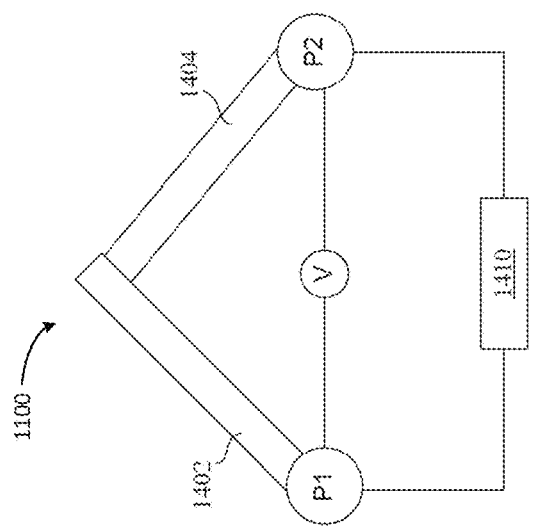
FIG. 11 schematically shows one example of bond-pad sharing between a transparent thermocouple and another electrical device of the slider in accordance with various embodiments.

According to some embodiments, and with reference to FIG. 11, a transparent thermocouple 1100 includes a first transparent element 1402 coupled to a first bond-pad, P1, and a second transparent element 1404 coupled to a second bond-pad, P2. Another electrical device, 1410, is also coupled to bond-pads P1 and P2 in parallel with the transparent thermocouple 1100. In some embodiments, the electrical device 1410 is a reader. The electrical device 1410 can also be any other suitable device, as described herein.

In general, the temperature thermocouple 1100 is operated during write operations and inactive during read operations. Conversely, the reader 1410 is active during read operations and inactive during write operations. Because the transparent thermocouple 1100 and the reader 1410 can be operated alternately, these two devices can be configured to share bond-pads P1 and P2. During write operations, for example, an open circuit voltage, V, of the transparent thermocouple 1100 can be measured as the potential between bond-pads P1 and P2. As was discussed previously, the transparent thermocouple 1100 can be used for one or more of measuring relative or absolute temperature near or at the NFT 512, including determining slider fly height and/or contact between the slider and a recording medium at a close point that includes the NFT 512, and monitoring output optical power of the laser (e.g., light source 220). The open circuit voltage V can be generated by a temperature difference induced by the laser. In a case where the laser is inactive while reading, the open circuit voltage V may also be negligible.

Figure 12:
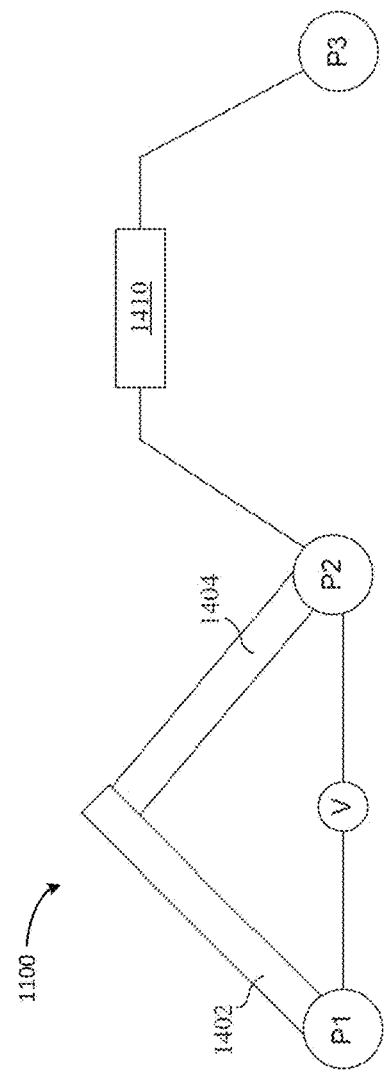
FIG. 12 schematically shows another example of bond-pad sharing between a transparent thermocouple and another electrical device of the slider in accordance with various embodiments.

FIG. 12 schematically shows another example of bond-pad sharing between a transparent thermocouple and another device of a slider (e.g., 202) in accordance with various embodiments. More particularly, the transparent thermocouple 1100 shares a common bond-pad, P2, with another device 1410 of the slider. The first transparent element 1402 of the thermocouple 1100 is coupled to a first bond-pad, P1, and the second transparent element 1404 is coupled to a second bond-pads, P2. The device 1410 is coupled to the second bond-pad, P2 and to a third bond-pad, P3. In some embodiments, the device 1410 can be a reader. In other embodiments, the device 1410 can be a contact sensor configured to sense thermal aspects (e.g., thermal asperities, thermal differentials, protrusions, etc.) of the recording medium. The device 1410 can also be any other suitable device, as described herein.

FIGS. 13-16 illustrate various circuit arrangements for use in the implementation of transparent thermocouples in HAMR devices using shared bond-pads, according to various embodiments.

Configurations illustrated with respect to FIGS. 13-16 relate to head-level transparent thermocouple-based sensors, and can include wiring arrangements including two thermal asperity (TA) (or other thermal aspect) slider bond-pads (e.g., bond-pads 30, 32), and in some cases other bond-pads and components, such as a ground bond-pad (e.g., ground bond-pad 34). An NFT (e.g., 210 or 512) can be situated at a slider (not shown, see e.g., FIG. 2, slider 202). A transparent thermocouple (e.g., 48, 56, 58) can be situated at the slider and configured to produce a signal indicative of temperature at the NFT (e.g., based on a thermal aspect of the medium and/or the NFT or slider itself). A detector component (e.g., a bolometer such as TCR 54 or 53) can also be coupled to the thermocouple. The detector can be configured to detect one or both of spacing changes and contact between the slider and a magnetic recording medium. Embodiments can provide relative movement between a magnetic recording medium and a slider configured for HAMR device applications. Embodiments can include sensing a temperature at an NFT of the slider using a transparent thermocouple. In various embodiments, the temperature can be a relative temperature or an absolute temperature.

Bond-pad (e.g., 22, 24, 26, 28, 30, 32, 34, 36, and 38) interconnects can be shared. For example, a pair of bond-pads can be utilized by more than a single component. For example, bond-pads 30 and 32 can be used by a TA component (e.g., 48, 54) and 32 and 34 by a resistor 49, which can be a bleeder device. In some cases, bolometer or TCR components (e.g., 53, 54) can therefore be employed as an (at least partial) heating source in order to reduce need for an on-wafer heat source. One example of a TCR component includes a dual-ended temperature coefficient of resistance sensor (DETCR). In particular, films on sliders have been showing a steady increase in signal strength with respect to Seebeck coefficients of thermocouples on head sliders (e.g., improvements in signal-to-noise ratios). External lasers (or other suitable light source(s)) can create heat thermal heating maps. There is a desire to have some quantity of parts tested using resistance TCR shared heating. One goal of the present invention is to keep an air bearing surface (ABS) boundary condition constant, solely due to a reader-heater's power. Frictional heating and/or detection can also be employed in embodiments.

Figure 13:
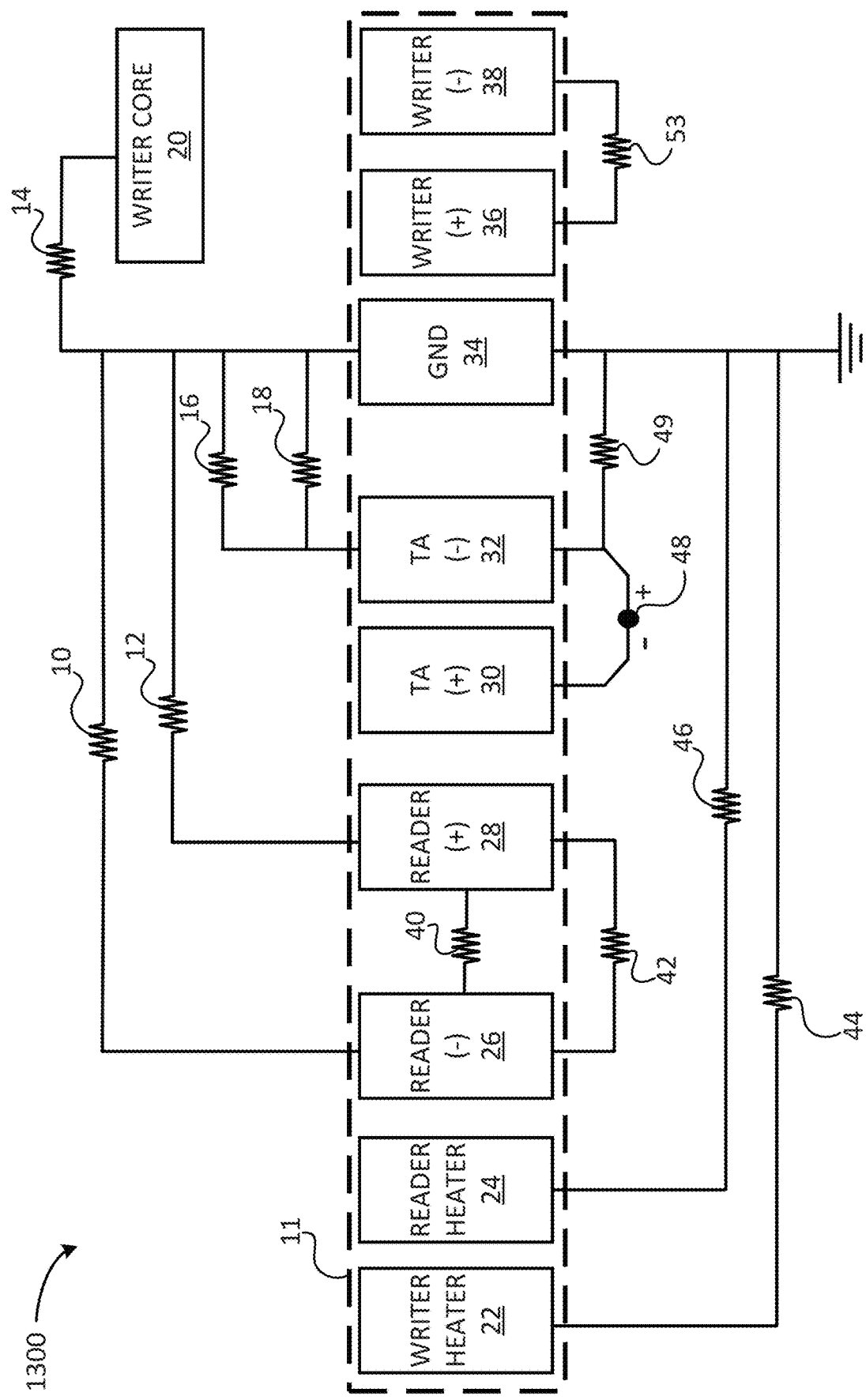
FIG. 13 is a circuit diagram of a head slider trailing edge bond-pad arrangement with connection of a thermocouple thereto using bond-pad sharing, according to various embodiments.

FIG. 13 is a circuit diagram 1300 of a head slider trailing edge bond-pad arrangement with connection of a thermocouple thereto using bond-pad sharing, according to various embodiments.

Circuit diagram 1300 includes a number of components, such as bond-pads, and associated wiring having various resistance/impedance values (referred to collectively as resistance, herein). Bond-pad set 11 can be located on a trailing edge of a slider, and bond-pad set 11 includes nine bond-pads, as shown. The bond-pads included in bond-pad set 11 include a writer heater bond-pad 22, a reader heater bond-pad 24, two reader bond-pads (negative terminal) 26, (positive terminal) 28, two thermal asperity detection (e.g., TCR) bond-pads (positive terminal) 30, (negative terminal) 32, a ground bond-pad 34, and two writer bond-pads (positive terminal) 36, (negative terminal) 38. Circuit diagram 1300 also includes a writer core 20 separate from the bond-pad set 11, but electrically connected thereto.

As shown, a single writer heater bond-pad 22 is electrically connected to ground via resistor 44. In various preferable embodiments, resistor 44 can be a writer heater device. Similarly, a single reader heater bond-pad 24 can be electrically connected to ground via resistor 46, which can be a reader heater device, according to various preferable embodiments.

Reader bond-pads 26 (−), and 28 (+), as shown, are electrically connected to each other via resistor 40, and separately through resistor 42. According to various embodiments, resistor 40 can be a bias shunt, and resistor 42 can be a reader device. In various embodiments, bias shunt 40 can have a resistance of about 1,000-1,500 ohms (a), and reader device 42 can have a resistance of about 30-300Ω. Reader bond-pads 26 (−) and 28 (+) can also be connected to ground via ground bond-pad 34 and also to each other through resistors 10 and 12, respectively. Resistors 10 and 12 can each be a reader bleeder configured to drain voltage from the reader 42 through reader bond-pads 26, 28 over time when not in use. In preferable embodiments, reader bleeders 10 and 12 can each of a resistance of about 20,000Ω. As shown, reader bond-pads 26 and 28 are also indirectly connected to each other via reader bleeders 10 and 12.

A pair of thermal asperity (TA) bond-pads, including positive terminal 30, and negative terminal 32 can be electrically connected (or coupled) through a transparent thermocouple 48, as described herein with respect to FIGS. 1-10. Thermocouple 48 can be a non-transparent thermocouple according to other embodiments, and can be configured to sense for a thermal aspect of a magnetic recording medium surface, as described herein. TA bond-pads 30, 32 can be configured for use in contact detection (e.g., TCR) schemes in HAMR devices, according to various embodiments. As shown, a (e.g., transparent) thermocouple 48, as described herein, is electrically connected to TA bond-pads 30 and 32, and thermocouple 48 preferably has a resistance in the range of mega-ohms (i.e., about 1,000,000Ω), but, as shown, no DETCR/TCR detector or bolometer device is connected between a first pair of bond-pads, TA bond-pads 30 and 32. The relatively high resistance (e.g., on the order of a mega-ohm) of the thermocouple 48 means that it may not shunt an appreciable amount of current. This feature can allow pad sharing opportunities not open to a more conductive (lower resistance) device or component. A resistor 53, which can be a second component, such as a TCR detector or a writer coil according to various embodiments, is shown electrically connected between a second pair of bond-pads, writer bond-pads 36 and 38. In a case where resistor 53 is a TCR detector, resistor 53 can have a preferable resistance of about 58Ω. According to some embodiments, the second pair of bond-pads 36 and 38 can include a bond-pad of the first pair of bond-pads 30 and 32. In an alternative case where resistor 53 is instead a writer coil, the resistance can be about 3-5Ω, and preferably about 3.1Ω. Preferable embodiments related to FIG. 13 include FIGS. 14-16, where the thermocouple 48 is accompanied by a proximate TCR detector, but through bond-pads 30 and/or 32 instead of writer bond-pads 36 and 38.

Optionally, a resistor 49 can connect a positive terminal of thermocouple 48 to ground. In preferable embodiments, resistor 49 can be a bleeder device having a resistance of about 10,000Ω.

As discussed, the ground bond-pad 34 is connected to a ground, and is also electrically connected to the writer heater bond-pad 22 through writer heater 44, reader heater bond-pad 24 through reader heater 46, and to negative terminal thermal asperity bond-pad 32 through resistors 16 and 18. According to preferable embodiments, resistors 16 and/or 18 can be bleed resistors which can each have a resistance of about 250,000Ω. In various embodiments, bleed resistors (e.g., 16 and 18) can provide a path to "bleed" off accumulated charge, but may not require a large resistance to provide minimal interference with an element being addressed.

Also shown electrically connected to ground bond-pad 34 are negative and positive reader bond-pads 26, and 28, through resistors 10 and 12, respectively. In preferable embodiments, resistors 10 and 12 represent reader bleeders. Writer core 20 is also connected to ground bond-pad 34 through resistor 14, which represents a writer bleeder, according to various embodiments. Various implementations that involve the writer core 20 may also contemplate whether a leg of a thermocouple junction may include various ground-related effects or otherwise introduce various ground-related factors. Between ground bond-pad 34 and a ground may be a gold (Au)-based connection with a resistance of approximately 2.5Ω.

Figure 14:
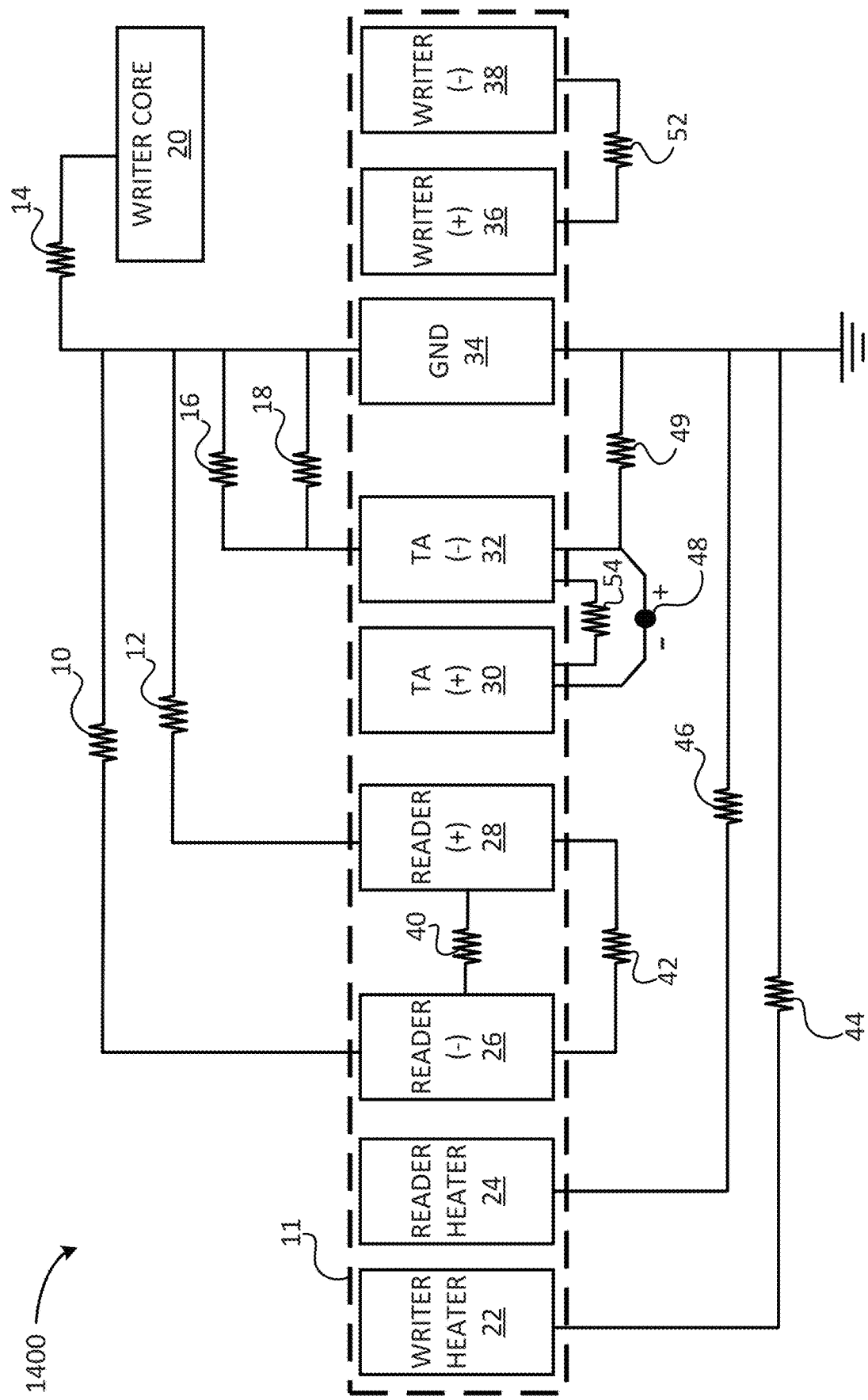
FIG. 14 is a circuit diagram of a head slider bond-pad arrangement with connection of a thermocouple and a temperature coefficient of resistance (TCR) detector thereto, according to various embodiments.

FIG. 14 is a circuit diagram 1400 of a head slider bond-pad arrangement with connection of a thermocouple and a TCR detector thereto, according to various embodiments.

The configuration of circuit diagram 1400 is similar to the circuit diagram 1300, and repeated features and characteristics will be omitted for the sake of brevity and clarity. However, circuit diagram 1400 has several distinguishing features when compared to circuit diagram 1300.

First, a resistor 54, and preferably a TCR detector 54 (e.g., a DETCR device), is now electrically connected between TA bond-pads 30 and 32 in parallel with thermocouple 48. TCR detector 54 preferably has a resistance of about 58-100Ω. As a second difference, as shown, a writer coil (resistor) 52 can be located in place of resistor 53 between writer bond-pads 36 and 38, the writer coil 52 preferably having a resistance of about 3-5Ω, (e.g., about 3.1Ω). According to the shown configuration, the various bond-pads of bond-pad set 11 can thus be shared in order to operate TCR detector 54 and thermocouple 48 using the TA bond-pads 30, 32.

TCR detector 54 is preferably an active bolometer device and can utilize a current flow in order to function and/or activate. In contrast, the thermocouple 48 can be a passive device that produces a voltage without an external bias. Although electrically connected in parallel to the TCR detector 54, the relatively high resistance of the thermocouple 48 can preferably cause only a minimal shunt effect (e.g., current flow therethrough in parallel) when the TCR detector 54 is energized.

Figure 15:
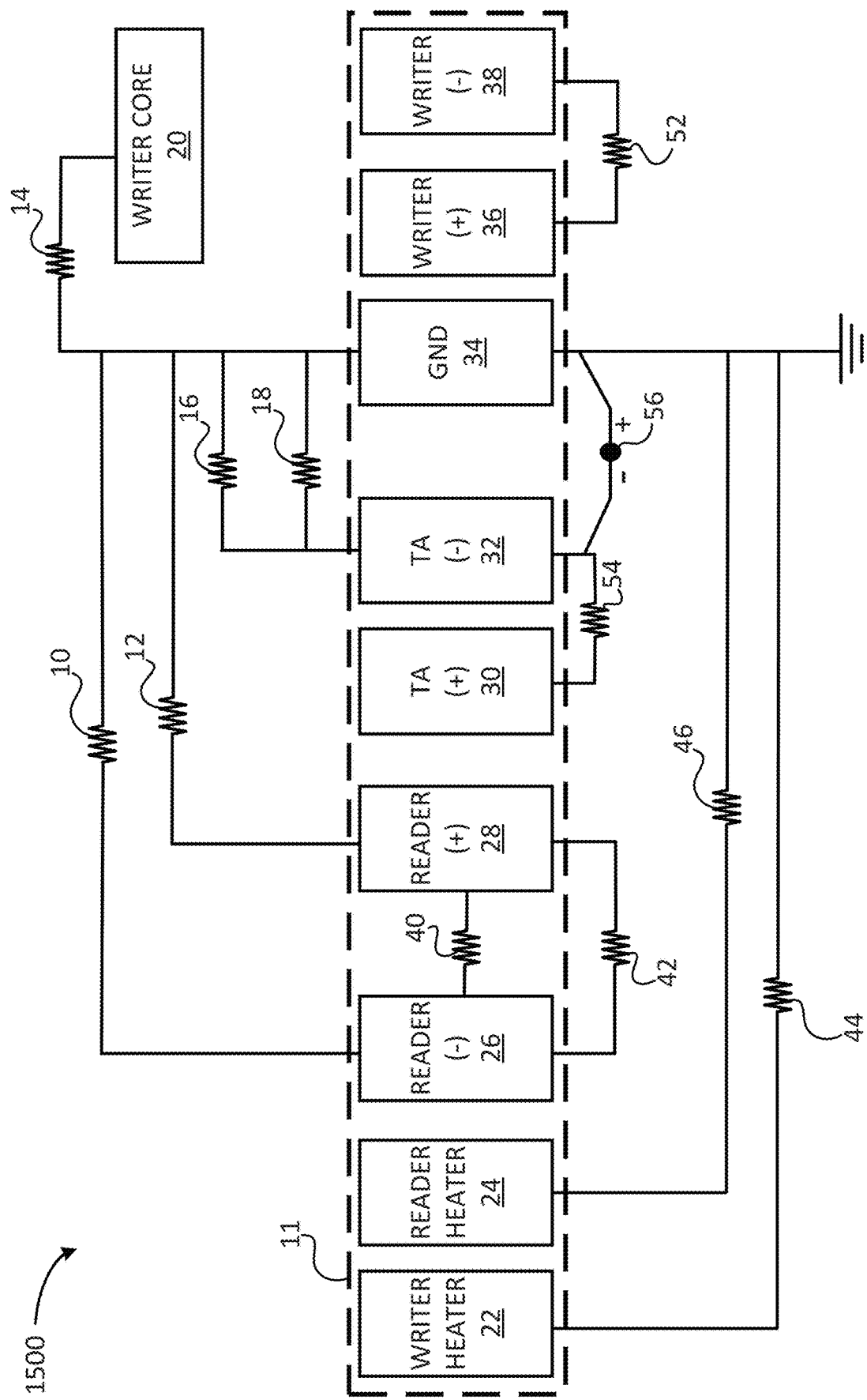
FIG. 15 is a circuit diagram of a head slider bond-pad arrangement with connection of a thermocouple and a TCR detector thereto, according to various embodiments.

FIG. 15 is a circuit diagram 1500 of a head slider bond-pad arrangement with connection of a thermocouple and a TCR detector thereto, according to various embodiments.

The configuration of circuit diagram 1500 is similar to the circuit diagram 1300, and repeated features and characteristics will be omitted for the sake of brevity and clarity. However, circuit diagram 1500 has several distinguishing features when compared to circuit diagram 1300.

As shown, and similar to FIG. 14, a TCR detector 54 is electrically connected between TA bond-pads 30 and 32, and the TCR detector 54 has a preferable resistance of about 58Ω. However, different than the embodiment shown in FIG. 14, thermocouple 56 replaces thermocouple 48, and is electrically connected between negative terminal TA bond-pad 32 and ground bond-pad 34. Specifically, thermocouple 56 is now connected to the negative terminal of TCR detector 54 as well as the negative terminal TA bond-pad 32. Similar to FIG. 14, a writer coil 52 can be located between writer bond-pads 36 and 38, and the writer coil 52 can preferably have a resistance of about 3-5Ω (e.g., about 3.1Ω). Alternatively, thermocouple 56 could electrically connect to the positive bond-pad 30 instead of negative bond-pad 32 (as shown) and the configuration could still function as desired. It is noted that directly connecting thermocouple 56 to ground bond-pad 34 can be subject to some electrical ground noise, in some embodiments. Various configurations can be employed to mitigate and/or filter ground noise, as known, if desired.

Figure 16:
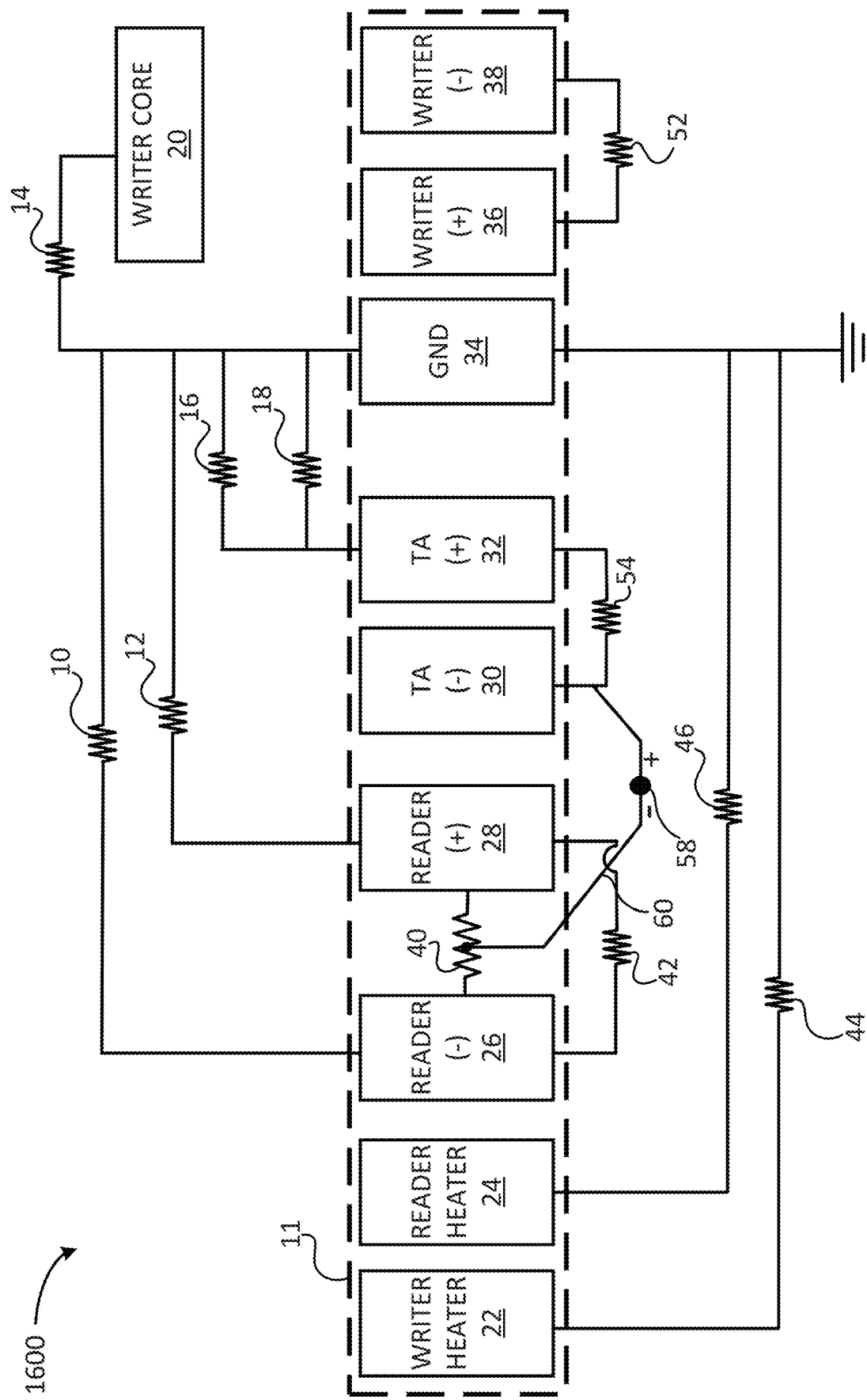
FIG. 16 is a circuit diagram of a head slider bond-pad arrangement with connection of a thermocouple and a TCR detector thereto, according to various embodiments.

FIG. 16 is a circuit diagram 1600 of a head slider bond-pad arrangement with connection of a thermocouple and a TCR detector thereto, according to various embodiments.

The configuration of circuit diagram 1600 is similar to the circuit diagram 1300, and repeated features and characteristics will be omitted for the sake of brevity and clarity. However, circuit diagram 1600 has several distinguishing features when compared to circuit diagram 1300.

Circuit diagram 1600 of FIG. 16 is distinguished from other disclosed embodiments at least in that a "center tap" at or near an operative voltage null point is used to facilitate the sharing of various bond-pads of bond-pad set 11. In order to share a bond-pad, a center-tap thermocouple 58 may be electrically coupled to a circuit formed by two bond-pads (negative and positive reader bond-pads 26, 28) having voltage potentials, with the thermocouple positioned in between and connected to resistor (bias-shunt) 40. The thermocouple 58 may be coupled to the reader circuit (formed by the bias shunt 40 and reader bond-pads 26, 28) at (or proximate thereto) a center tap, which is preferably located at or near a null point (e.g., a resistance midpoint) in the reader circuit. In embodiments, a center tap located proximately to a voltage null point can be determined based on an electrical potential gradient.

Thermocouple 58 is electrically connected between TA bond-pad 30 and reader shunt 40 through electrical center tap connection 60. In particular, connection 60 is electrically connected to shunt 40 at a resistance midpoint of shunt 40. For example, in a preferable embodiment, shunt 40 has a total resistance of 1,000Ω. Therefore, a resistance (or voltage potential) midpoint of shunt 40 would be located at a point on shunt 40 where each connection of shunt 40 has a resistance of 500Ω between that connection and connection 60 at a center tap location. In another preferable embodiment, shunt 40 has a total resistance of 1,500Ω, and a center tap location can be chose midway between two segments each having about 750Ω, or half of the total shunt 40 resistance.

During a reader operation, the two voltage potentials (of reader bond-pads 26, 28) can be configured to be of opposite polarity, and the two voltage potentials can also be alternating such that a reader waveform is an alternating current (AC) signal. The null point in the reader circuit is defined as a point at which the potential at any instant of time is zero. The two bond-pad potentials, at other times, may have a same voltage polarity (common mode voltage), in which case the thermocouple 58 could be active and the reader would become inactive. In some embodiments, there may not exist a desire to operate a reader device and thermocouple 58 as described herein at the same time in a slider of a HAMR device, leading to a beneficial compromise to performance in such a configuration. In various embodiments, various readers can function to deliver a bit error rate, among other data.

Similar to FIG. 14, a writer coil 52 is located between writer bond-pads 36 and 38, the writer coil 52 preferably having a resistance of 3.1Ω.

As used herein, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

It is understood that numerous variations of slider configurations for use in various devices could be made while maintaining the overall inventive design of various components thereof and remaining within the scope of the disclosure. Numerous alternate design or element features have been mentioned above. Reference is made herein to the accompanying drawings that form a part hereof and in which are shown by way of illustration at least one specific embodiment. The detailed description provides additional specific embodiments. Although certain features are described generally herein relative to particular embodiments of the invention, it is understood that the features are interchangeable between embodiments to arrive at methods and structures for configuring sliders for the addition of transparent thermocouple using bond-pad sharing.

It is to be understood that other embodiments are contemplated and may be made without departing from the scope or spirit of the present disclosure. The detailed description, therefore, is not to be taken in a limiting sense. While the present disclosure is not so limited, an appreciation of various aspects of the invention will be gained through a discussion of the examples provided.

What is claimed is:

1. An apparatus, comprising:
   a slider configured for heat-assisted magnetic recording, the slider comprising an air bearing surface (ABS), a writer, a reader, a near-field transducer, and a plurality of electrical bond-pads; and
   a thermocouple situated at the ABS of the slider proximate the near-field transducer and operatively coupled to a first pair of the plurality of electrical bond-pads, the thermocouple configured to sense for a thermal aspect of a magnetic recording medium surface;
   wherein the slider is configured to share at least one bond-pad by operatively coupling a second pair of the plurality of electrical bond-pads to a detector component, and wherein the slider is configured to selectively utilize the thermocouple and the detector component.

2. The apparatus of claim 1, wherein the second pair of bond-pads includes a bond-pad of the first pair of bond-pads.

3. The apparatus of claim 1, wherein the detector component is a thermal coefficient of resistance device.

4. The apparatus of claim 3, wherein the thermal coefficient of resistance device is configured to share at least one bond-pad with the thermocouple.

5. The apparatus of claim 1, wherein the thermocouple is a transparent thermocouple.

6. The apparatus of claim 1, wherein the thermocouple is configured to produce a signal indicative of at least one selected from the group consisting of: a spacing between the slider and the surface of the magnetic recording medium, a contact between the slider and the surface of the magnetic recording medium, a temperature at the near-field transducer, and an output of a light source.

7. The apparatus of claim 1, wherein the thermocouple is situated away from the ABS of the slider by a distance of up to about 1.5 μm.

8. The apparatus of claim 1, wherein the thermocouple is configured to produce a signal indicative of an absolute temperature at or proximate the near-field transducer.

9. The apparatus of claim 1, wherein the detector component is configured to detect at least one selected from the group consisting of: spacing between the slider and the surface of the magnetic recording medium, spacing changes between the slider and the surface of the magnetic recording medium, and contact between the slider and the surface of the magnetic recording medium.

10. The apparatus of claim 1, wherein the sensing of the thermal aspect is indicative of head-to-medium spacing or contact.

11. The apparatus of claim 1, wherein the thermal aspect comprises a protrusion.

12. The apparatus of claim 1, wherein the thermal aspect comprises a thermal asperity.

13. The apparatus of claim 1, wherein the first pair of bond-pads comprises at least one bond-pad that is not shared with the second pair of bond-pads.

14. The apparatus of claim 1, wherein the second pair of bond-pads is the same as the first pair of bond-pads.

15. The apparatus of claim 1, wherein at least one bond-pad of the first pair of bond-pads is electrically connected to ground via a bleeder device.

16. The apparatus of claim 1, wherein the thermocouple is a passive device configured to produce a voltage without an external bias, and wherein the detector device is an active device configured to utilize a current in order to function and/or activate.

17. The apparatus of claim 16, wherein the detector component having a first electrical resistance, and wherein the thermocouple has a second electrical resistance greater than the first electrical resistance.

18. A method of making an apparatus, comprising:
    providing a slider configured for heat-assisted magnetic recording, the slider comprising an air bearing surface (ABS), a writer, a reader, a near-field transducer, and a plurality of electrical bond-pads;

providing a thermocouple situated at the ABS of the slider proximate the near-field transducer and operatively coupled to a first pair of the plurality of electrical bond-pads, the thermocouple configured to sense for a thermal aspect of a magnetic recording medium surface; and operatively coupling a second pair of the plurality of electrical bond-pads to a detector component, wherein the slider is configured to share at least one bond-pad, and wherein the slider is configured to selectively utilize the thermocouple and the detector component.

19. A method of using an apparatus, comprising:

providing a slider configured for heat-assisted magnetic recording, the slider comprising a writer, a reader, a near-field transducer, a bolometer having a first electrical resistance, a thermocouple having a second electrical resistance that is greater than the first electrical resistance, and a plurality of electrical bond-pads;

wherein the thermocouple is coupled to a first pair of the plurality of electrical bond-pads, and wherein the thermocouple is a passive device configured to produce a voltage without an external bias;

wherein the bolometer is coupled to a second pair of the plurality of electrical bond-pads, and wherein the bolometer is an active device configured to utilize a current in order to function and/or activate; and selectively operating the bolometer or thermocouple, wherein either:
  a) the bolometer is activated by a current at the second pair of bond-pads in order to sense for a thermal aspect of a magnetic recording medium surface, or
  b) the thermocouple produces a voltage without an external bias in order to sense for a thermal aspect of a magnetic recording medium surface.

20. The method of claim 19, wherein the thermocouple and bolometer share at least one bond-pad.

* * * * *